United States Patent [19]
Valyi

[11] Patent Number: 5,206,039
[45] Date of Patent: Apr. 27, 1993

[54] APPARATUS FOR CONDITIONING PRESSURE MOLDED PLASTIC ARTICLES

[76] Inventor: Emery I. Valyi, 19 Moseman Ave., Katonah, N.Y. 10536

[21] Appl. No.: 764,911

[22] Filed: Sep. 24, 1991

[51] Int. Cl.⁵ .............................................. B29C 49/64
[52] U.S. Cl. .................... 425/526; 198/459; 425/534
[58] Field of Search ................ 425/534, 522, 526; 198/459

[56] References Cited

U.S. PATENT DOCUMENTS

| | | | |
|---|---|---|---|
| 4,106,886 | 8/1978 | Sokolow | 425/534 X |
| 4,318,882 | 3/1982 | Agrawal et al. | 264/521 |
| 4,323,341 | 4/1982 | Valyi | 425/534 X |
| 4,354,813 | 10/1982 | Collombin | 425/534 X |
| 4,522,581 | 6/1985 | Schad et al. | 425/534 |
| 4,589,559 | 5/1986 | Hayashi et al. | 264/521 X |
| 4,690,633 | 9/1987 | Schad et al. | 425/534 X |
| 4,694,951 | 9/1987 | Gibbemeyer | 425/534 X |

Primary Examiner—Richard L. Chiesa
Attorney, Agent, or Firm—Bachman & LaPointe

[57] ABSTRACT

The present invention discloses an apparatus including a pressure molding machine for delivering plastic articles, a finishing machine for performing a finishing operation upon said articles, a conditioning section operative to adjust the temperature of said articles between the pressure molding machine and finishing machine, a first transporter adapted to remove the articles from the pressure molding machine and a second transporter adapted to transport the articles from the first transporter to the conditioning section.

32 Claims, 19 Drawing Sheets

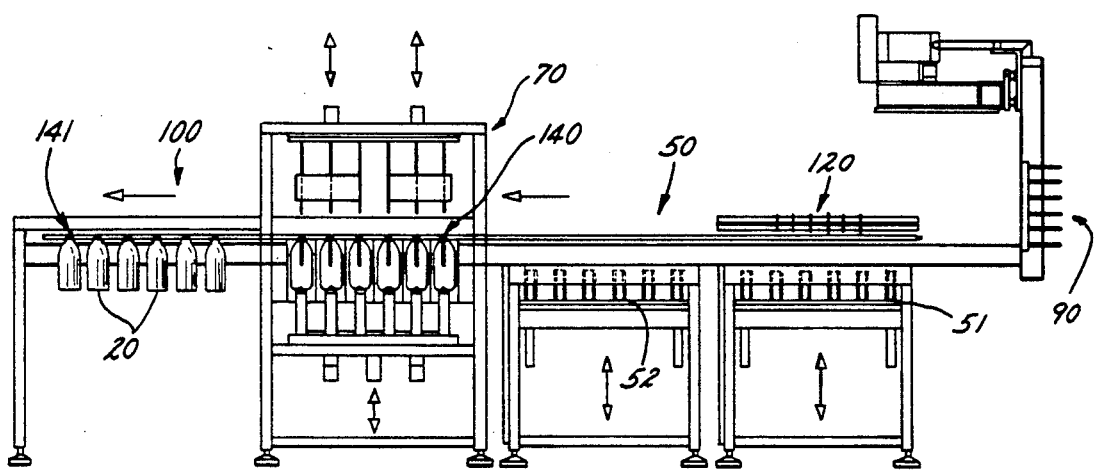
FIG-9A
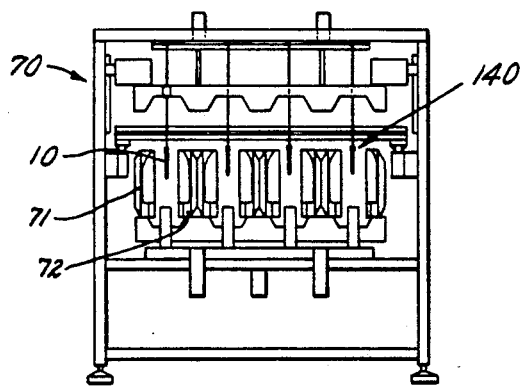 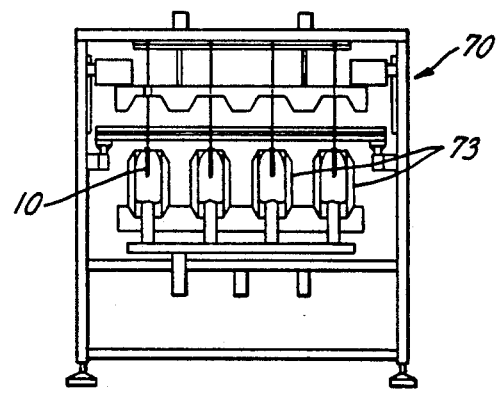
FIG-9B         FIG-9C

5,206,039

APPARATUS FOR CONDITIONING PRESSURE MOLDED PLASTIC ARTICLES

BACKGROUND OF THE INVENTION

1. Field of Invention

The present invention relates to an apparatus for conditioning pressure molded plastic articles that incorporates a variety of linearly interconnected operating sections for the performance of processing steps synchronously with an in-feed from a machine having an intermittent output and a discharge into another machine that requires a similarly intermittent in-feed. In particular, the apparatus of the present invention accommodates operations intermediate between the production of plastic preforms and their transformation into hollow articles, such as bottles and the like, according to the well known process of blow-molding bi-axially oriented plastic containers.

2. Description of the Prior Art

Conventionally, when intermediary processing operations have to be interposed between two disparate manufacturing steps, the tendency is to avoid performing the latter, as well as the intermediary operations, in synchronism due to difficulties in constructing corresponding apparatus and to control the several processing steps that may be involved. This applies particularly to the production of molecularly oriented plastic articles, as for example containers made of orientable plastics, such as polyethylene terephthalate (PET), other polycondensation resins and polyolefins.

Bi-axially oriented plastic containers are usually produced using either a two stage, or single stage process, both of which have disadvantages.

In the two-stage process, parisons are produced by extrusion, preferably in an injection molding machine, cooled to room temperature, stored and conveyed in bulk to a re-heat and blow machine. The two operations are not synchronous, their respective outputs differ and their combined performance wastes energy.

In the single-stage process, the operations of injection molding and blow molding are combined within one machine in which the parisons are indexed in conventional ways from one to the other, in effect eliminating the need to convey them. However, this is accomplished at the expense of accurate control of the process parameters, such as the temperature distribution within the parisons and also, with but a minimum of possible intermediate processing steps that are increasingly called for. Thus, the single-stage process is limited to relatively simple products and low outputs, the latter because of design limitation of the typical single-stage apparatus.

It is highly desirable and an objective of the present invention to develop a continuous, synchronous system for conditioning pressure molded plastic articles and preferably for preparing hollow plastic articles from injection molded plastic parisons especially capable of transferring to a blow molding machine the entire output of an injection molding machine while adjusting the temperature thereof, or otherwise conditioning on-line the entire output so as to obtain desired morphology and physical properties in the blown oriented hollow plastic articles in an uninterrupted, synchronous operating cycle which is independent of the number of the required conditioning stages.

It is a still further objective of the present invention to perform a crystallizing operation of PET within the said cycle.

It is particularly desirable and a further objective of the present invention to accommodate in the aforesaid system parisons having axially variable wall thickness which therefore present particular temperature conditioning problems.

An additional objective is to adapt the output of the injection molding machine and that of the intermediate operations to the pace at which the blow molding machine is capable of processing parisons.

An additional objective is to accomplish the foregoing while varying the center spacing of the parisons from the closer center spacing of the injection molding apparatus to the wider center spacing of the blow molding apparatus.

Further objects and advantages of the present invention will appear hereinbelow.

SUMMARY OF THE INVENTION

It has been found that the apparatus of the present invention readily obtains the foregoing objects and advantages.

The present apparatus conditions pressure molded plastic articles preparatory to a finishing operation, and comprises:

means for delivering pressure molded plastic articles and preferably a pressure molding machine for forming a plurality of pressure molded plastic articles;

a finishing machine for performing a finishing operation upon said articles downstream of the delivery means;

a conditioning section operative to adjust the temperature of said articles between said delivery means and said finishing machine;

at least one conditioning station within said conditioning section including means to cool said articles according to a predetermined pattern;

at least one conditioning station within said conditioning section including means to heat said articles according to a predetermined pattern;

first transport means adapted to remove said articles from said delivery means; and second transport means adapted to transfer said articles from said first transport means to said conditioning section.

Preferably, the delivery means is a pressure molding machine, although the articles may be formed at a different time or location and processed in the present apparatus from cold plastic articles. Naturally, if one starts with cold plastic articles the conditioning section would first include the conditioning station with means to heat followed by the conditioning station with means to cool. Thus, it may be seen that the order or arrangement of the conditioning stations may be varied based on requirements.

In a preferred embodiment the apparatus of the present invention conditions pressure molded plastic articles preparatory to a finishing operation and comprises: a pressure molding machine for forming a plurality of plastic parisons having axially variable wall thickness in a mold wherein said plurality of parisons have a first center spacing in said mold;

a blow molding machine for forming hollow plastic articles from said parisons downstream of the pressure molding machine in a blow mold in which said parisons and hollow articles formed therefrom have a second center spacing larger than said first center spacing;

a conditioning section operative to condition said parisons between said pressure molding machine and blow molding machine;

at least one conditioning station within said conditioning section including means to alternately cool and heat said parisons according to a predetermined axial pattern so as to induce a corresponding pattern of deformation of said Parisons while being processed in said blow molding machine;

first transport means adapted to remove said parisons from said pressure molding machine and to cool said parisons; and second transport means adapted to transfer said parisons from said first transport means to said conditioning section and operative to change the center spacing of said parisons from said first center spacing to said second spacing.

In a preferred embodiment, the conditioning stations are operative to induce a corresponding pattern of deformation in plastic parisons while said parisons are processed in a blow molding machine. The conditioning section may comprise a single conditioning station operative to cool and heat, or at least two separate conditioning stations one of which is operative to cool and the other is operative to heat. It is further advantageous to provide means for transporting the articles through the conditioning section at the same level throughout their transport, wherein the conditioning section includes means to move the conditioning station or stations into adjacent heat exchange relationship with the articles. Further, it is advantageous to provide that the first transport means include means to prevent the articles from bending and to provide that the second transport means maintain the articles in a vertical orientation.

In a preferred embodiment, the apparatus of the present invention prepares hollow plastic articles and comprises:

a pressure molding and preferably an injection molding machine but which may also be an extrusion molding machine for forming a plurality of plastic parisons having axially variable wall thickness in a mold and preferably an injection mold wherein said plurality of parisons have a first center spacing in said mold;

a blow molding machine for forming hollow plastic articles from said parisons downstream of the pressure molding machine in a blow mold in which said parisons and hollow articles formed therefrom have a second center spacing larger than said first center spacing;

a conditioning section operative to condition said parisons between said pressure molding machine and blow molding machine;

at least one conditioning station within said conditioning section including means to alternately cool and heat said parisons according to a predetermined axial pattern so as to induce a corresponding pattern of deformation of said parisons while being processed in said blow molding machine;

first transport means adapted to remove said parisons from said pressure molding machine and to cool said parisons; and second transport means adapted to transfer said parisons from said first transport means to said conditioning section and operative to change the center spacing of said parisons from said first center spacing to said second center spacing.

The apparatus of the present invention provides for synchronous transporting and processing between disparate production steps, i.e., the molding, transporting, temperature conditioning, changing the center spacing and blow molding operations in synchronism to provide an integrated, efficient and expeditious cycle.

Alternate heating and cooling may take place in a single station but preferably within a section containing several stations, as for cooling according to a predetermined pattern, heating according to a selected pattern, crystallizing of selected areas and heat setting in the course of a preliminary blowing operation.

Additional sections may be provided to perform operations other than conditioning of parisons, for example, to inspect the product for the presence of defects in the course of the cycle of the other operations.

In a further embodiment at least a third transport means is provided for transferring the parisons from the section proceeding the blow molding machine to the blow molding machine. Whenever more than one conditioning station is provided downstream of the first conditioning station within the conditioning section, a third transport means may transfer the parisons between conditioning stations.

According to an advantageous embodiment of the present invention, the conditioning and other sections and the blow molding machine may be adapted to process the number of parisons formed at the same time in the pressure molding machine in a single, synchronous cycle.

The conditioning section may include radiant or convective heating means and convective or conductive cooling means.

Either transport means may change the center spacing of the parisons while transporting parisons. Preferably the second transport means is so used while it moves between first transport means and the conditioning section. Also, if desired, the second transport means may transfer the parisons from the conditioning section to the blow mold. A blown product removal station may be provided adjacent the blow molding machine to remove the final hollow article from the apparatus. If desired, the third transport means may remove the blown articles from the blow molding machine or a separate means may be provided for this purpose.

The above reference to crystallizing and heat setting concerns well known operations frequently performed on PET and other crystalline polymers in order to provide them with particular properties, such as differences in transparency and heat resistance, as shown among others in U.S. Pat. Nos. 4,589,559 and 4,318,882.

Further features of and advantages of the present invention will appear hereinbelow.

BRIEF DESCRIPTION OF THE DRAWINGS

The present invention will be more readily understandable from a consideration of the following illustrative examples therein:

FIGS. 9A–9C show the conditioned parisons moved to the blow molding machine;

DETAILED DESCRIPTION OF THE PREFERRED EMBODIMENTS

Figure 1:
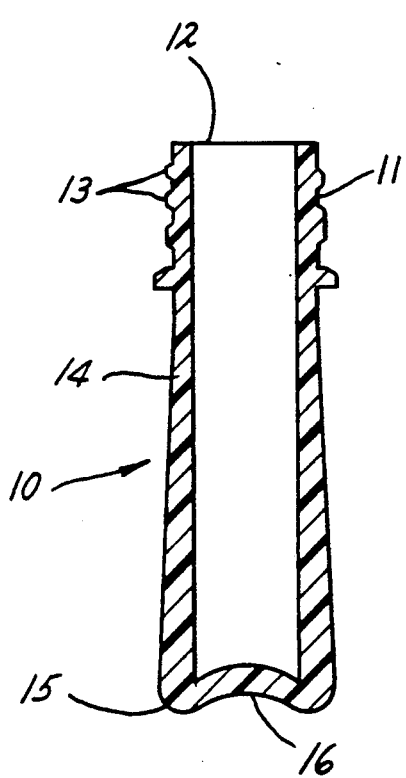
FIG. 1 is a sectional view of a parison formed in the apparatus of the present invention.

Referring now to the drawings in detail, FIG. 1 shows a representative plastic preform or parison 10 formed by pressure molding from a synthetic resin which can preferably be bi-axially oriented, as for example polyethylene terephthalate. The parison has a neck portion 11 defining an opening 12 and it may be provided with external threads 13 to serve as the site for attachment of a cap on the finished blow molded plastic container shown in FIG. 2. The parison 10 has a tubular body portion 14 depending from the neck portion 11 with an axially variable wall thickness and an integral bottom structure 15 depending from the tubular body portion. The bottom structure may exhibit various geometric configurations, as for example, an axially inwardly directed conical part 16 shown in FIG. 1 or a flat bottom.

Figure 2:
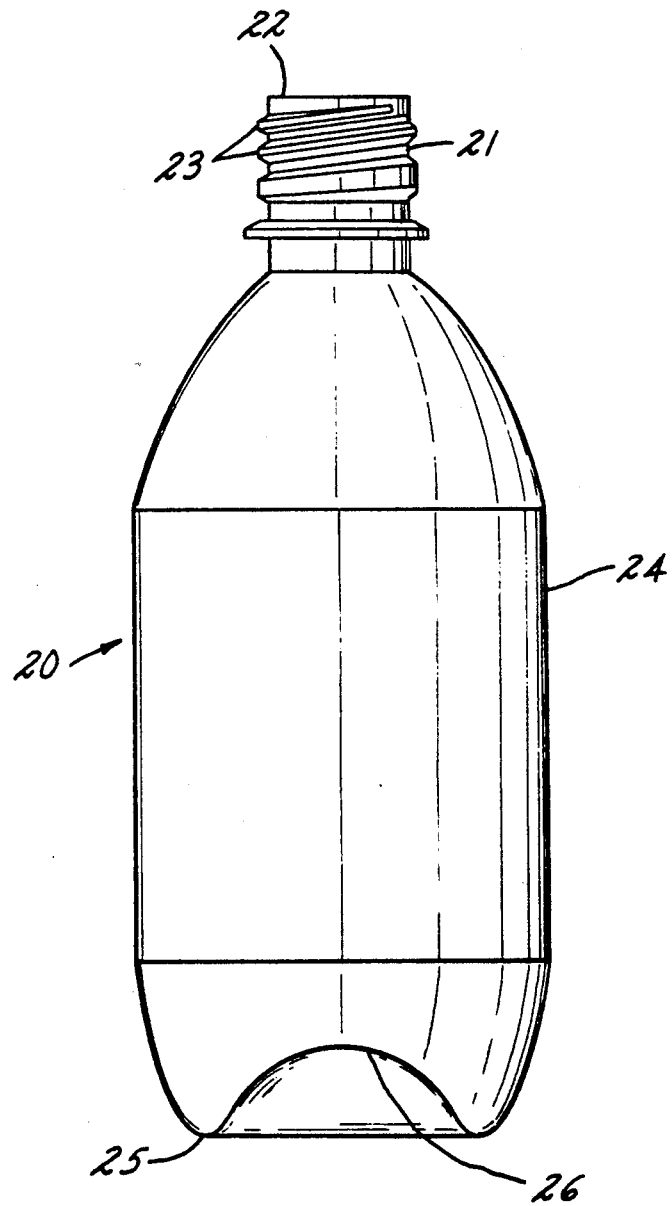
FIG. 2 is an elevation view of a hollow plastic container prepared from the parison of FIG. 1.

FIG. 2 shows a blow molded container 20 formed from the parison 10 of FIG. 1 in a blow molding machine adjacent the apparatus of the present invention. Container 20 has a neck portion 21 defining an opening 22 and including external threads 23 corresponding to neck 11, opening 12 and threads 13, respectively, on parison 10. Container body portion 24, bottom 25 and conical part 26 correspond to parison body 14, bottom 15 and conical part 16, respectively. Naturally, here also, other sizes and shapes may be readily employed.

Figure 3:
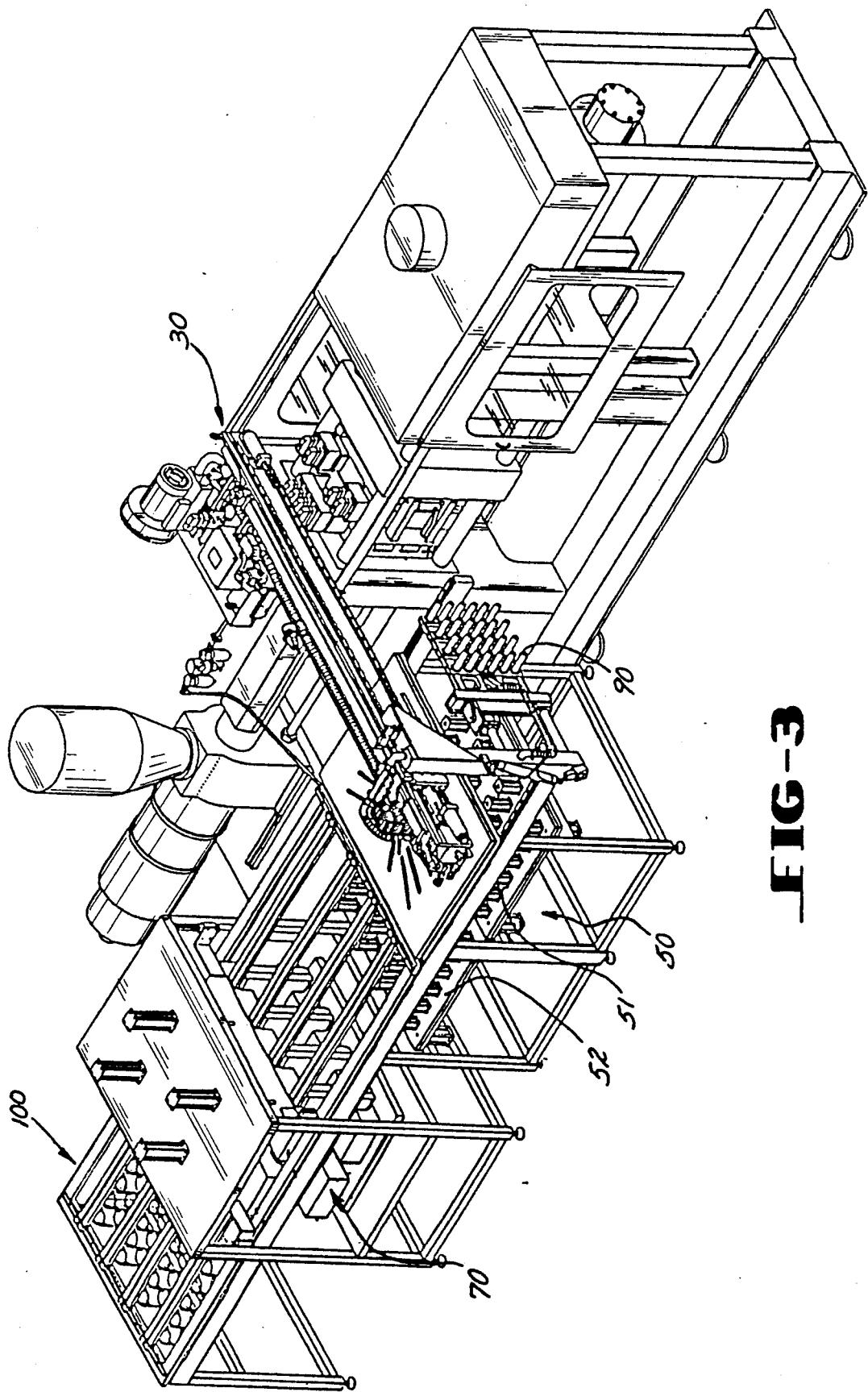
FIG. 3 is a perspective view of the apparatus of the present invention.

FIG. 3 is a perspective schematic view of the apparatus of the present invention showing an injection molding machine 30, conditioning section 50 including a first conditioning station 51 and a second conditioning station 52, and blow molding machine 70. FIG. 3 also shows first transport means 90 and blown product removal station 100. The features of the present invention will be more clearly shown in the succeeding schematic detailed drawings.

Figure 4:
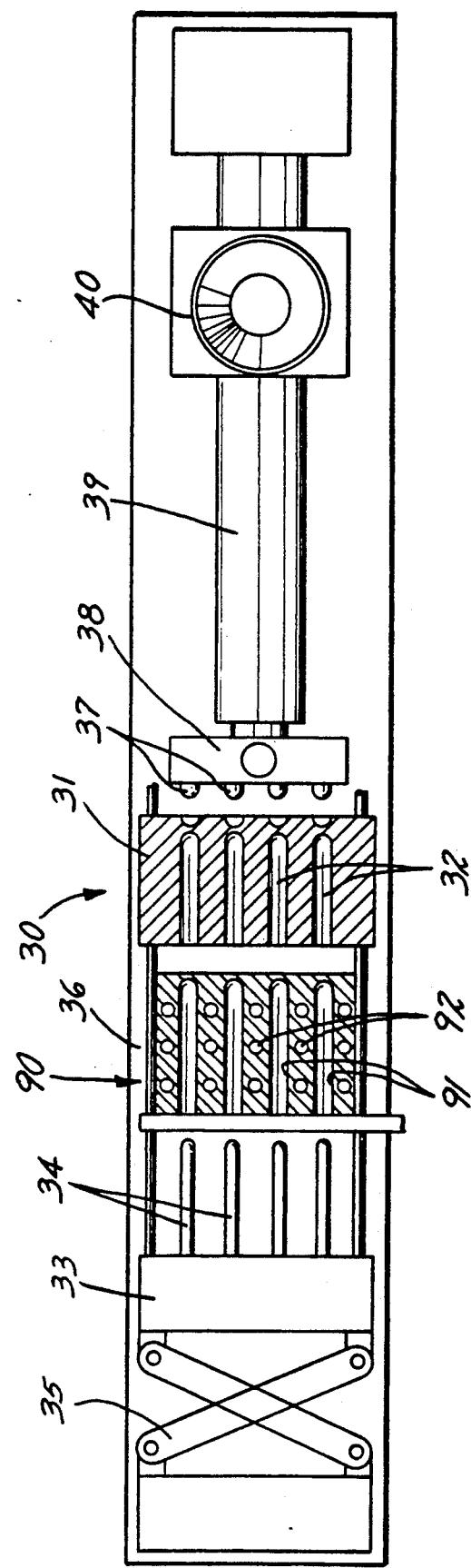
FIG. 4 is a plan view of the parison molding machine.

FIG. 4 is a detailed schematic view of injection molding machine 30 which is of conventional construction. It should be understood that throughout the present specification appropriate motive means as well known in the art are employed for moving the various components. Injection molding machine 30 carries female mold half 31 with four (4) mold cavities 32 shown and male mold half 33 with four (4) cores 34 shown. Male mold 33 moves towards female mold 31 so that cores 34 engage mold cavities 32 to form a closed mold for injection molding therein a parison 10 therein such as shown in FIG. 1. Male mold 33 is moved via motive means 35 FIG. 4 shows the injection mold 30 in the open position with a space 36 between the male and female mold halves and with the first transport means 90 positioned in the space between the open mold halves. Nozzles 37 are shown engageable with molds 32 and fed by hot runner 38, injection unit 39 and hopper 40. Transport means 90 include a plurality of sleeves or cavities 91 engageable with the formed parisons extracted from cavities 32 and held on cores 34 for transfer to cavities 91, as by suction means (not shown). The sleeves or cavities 91 prevent the hot articles from bending. The transport means 90 includes cooling means 92 for adjusting the temperature of the parison while located in transport means 90. Parisons 10 may be transferred to transport means 90 from cores 34 by any suitable mechanical means known in the art, as well as by suction applied within sleeves 91. While only four mold cavities are shown in FIG. 4, it should be understood that it is an advantage of the present invention that as many parisons may be handled by the present apparatus as are conventionally molded simultaneously, e.g., up to 96, even in the largest extant parison molding machines, this number being simultaneously processed in a single cycle in the conditioning section and blow molding machine.

While the injection molding machine is here shown to be horizontal, it is noted that a vertical machine may be equally well employed, whereby the transport means 90 is correspondingly modified, as is obvious to one skilled in the art.

Figure 5A:
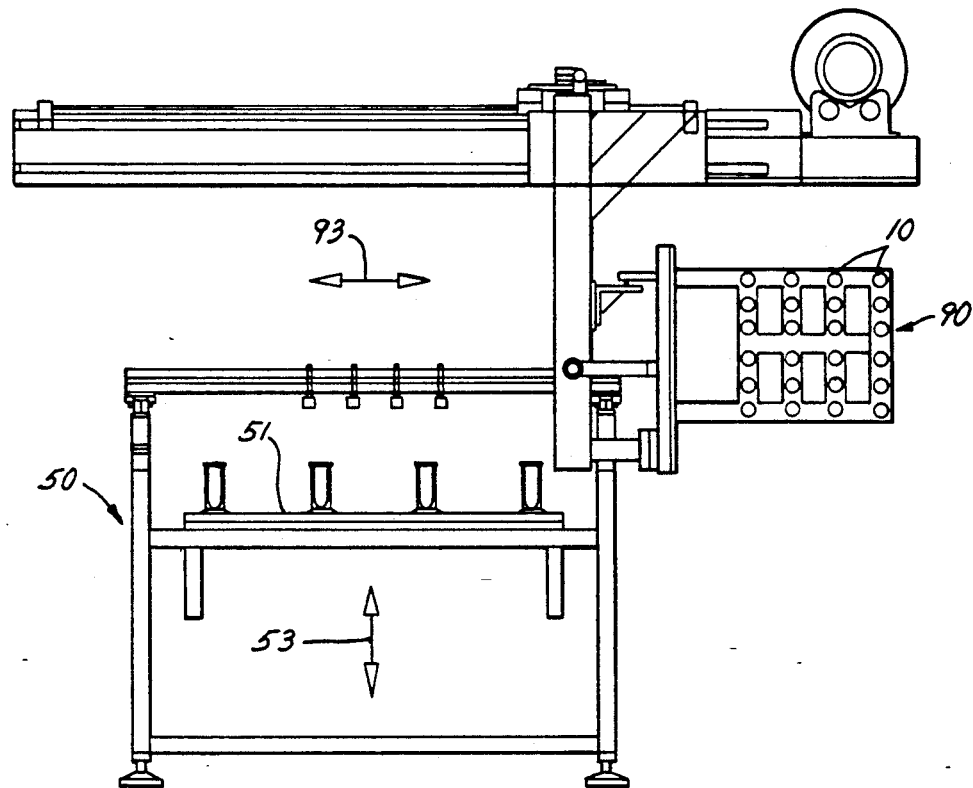
FIGS. 5A–5D show the movement of the first transport means with parisons thereon from the injection molding machine to the second transport means.

FIG. 5A shows an end view of the apparatus of the present invention with the first transport means 90 having moved into the position shown in FIG. 4 in the direction of arrow 93 to receive the ejected parisons, i.e., between the injection mold halves in the mold open position. As shown in FIG. 5A, transport means 90 includes 24 sleeves to hold 24 parisons 10 which in this case represents the entire output of the injection molding machine in a single cycle FIG. 5A also shows conditioning section 50 with the first conditioning station 51 thereof downstream of and alongside the injection molding machine. As shown by arrow 53, conditioning station 51, is movable up and down, as will be described hereinbelow, by motive means not shown.

Figure 5B:
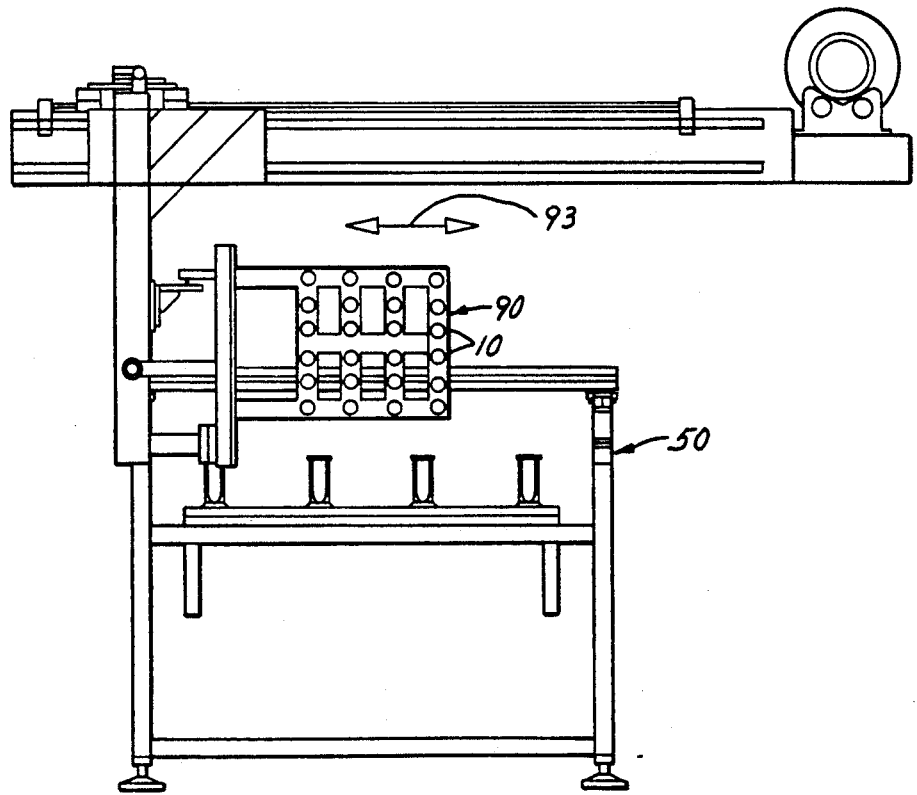

First transport means 90 receives the output of parisons 10 from the injection molding machine 30 in FIG. 5A and moves out of the open mold in the direction of arrow 93 shown in FIG. 5B. FIG. 5B is the same end view of the apparatus of the present invention as FIG. 5A, but with first transport means 90 with parisons 10 thereon moved into juxtaposition with first conditioning station 51 in-line with second conditioning station 52 and with blow molding machine 70 as shown in FIG. 3.

Figure 5C:
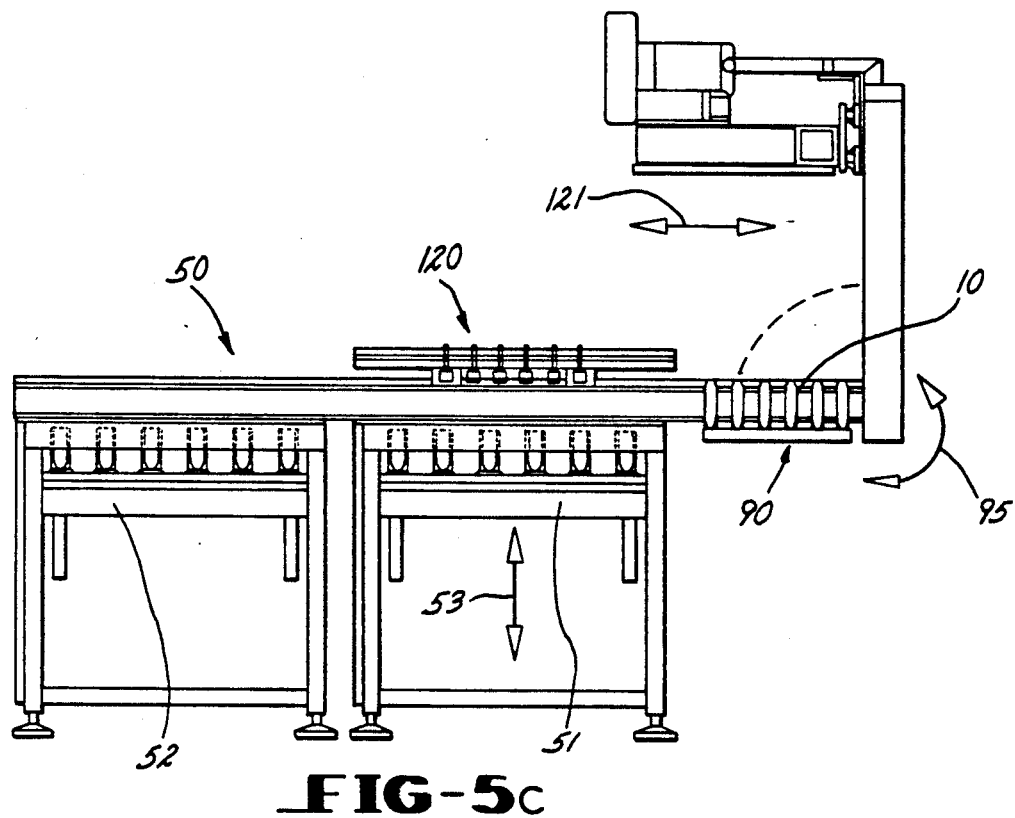
Figure 5D:
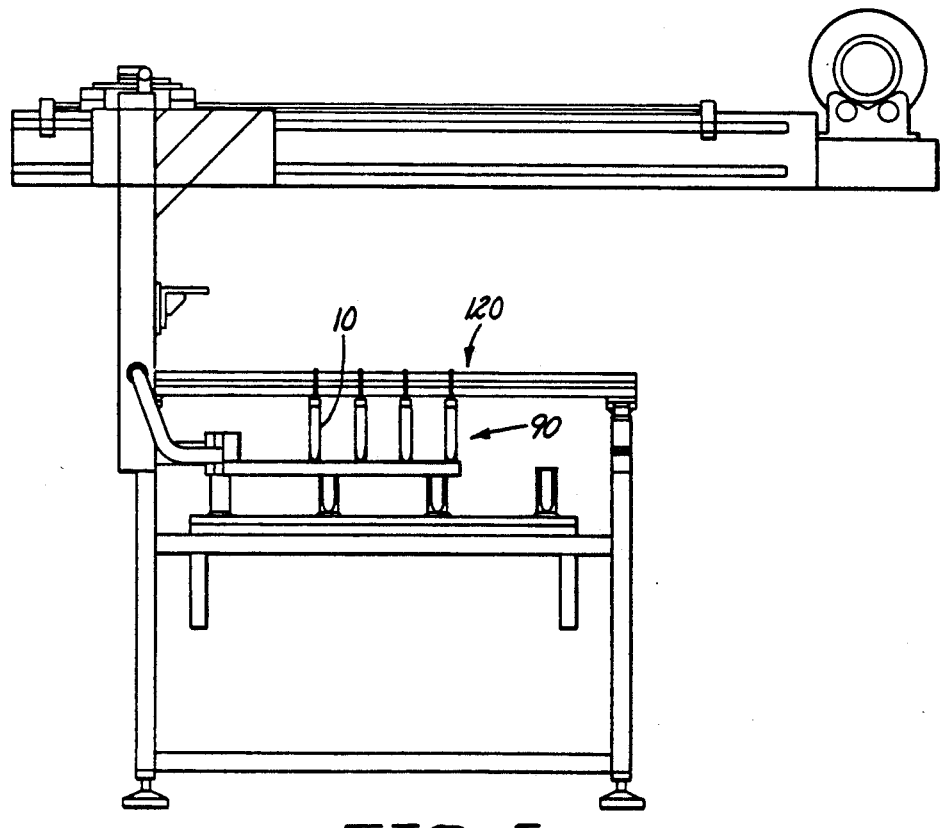
Figure 6A:
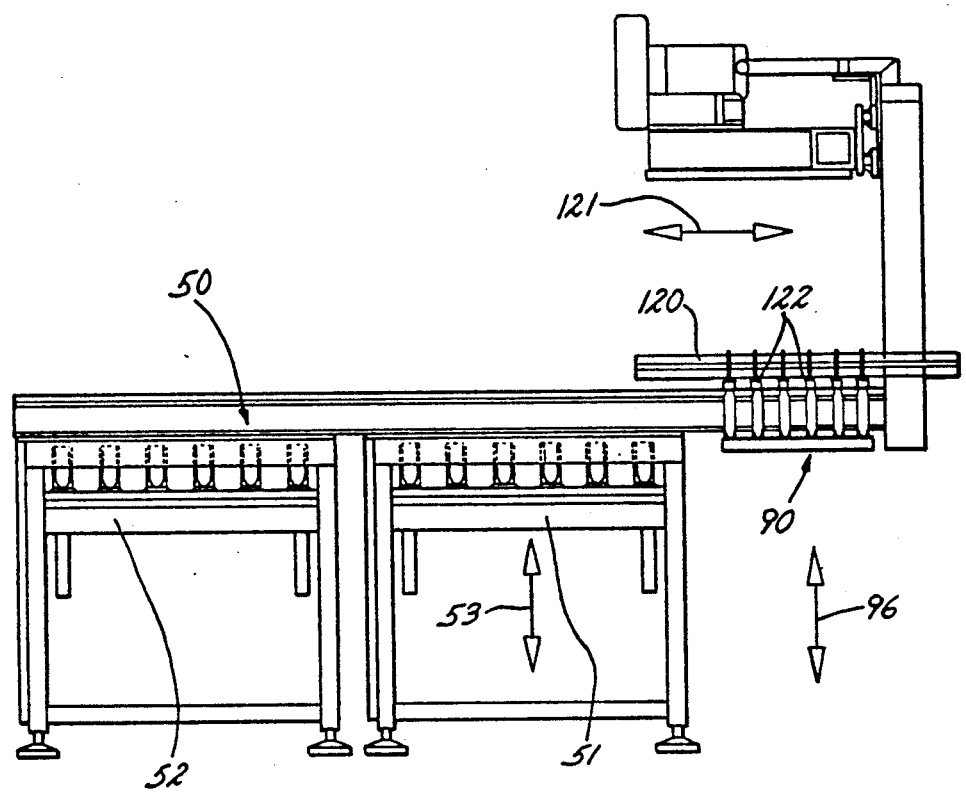
FIGS. 6A–6D show the transfer of the parisons from the first transport means to the second transport means.

FIGS. 5C and 5D show end and side views respectively wherein the first transport means 90 tilts downwardly as shown by arrow 95 in FIG. 5C whereby the parisons 10 become vertically positioned and accessible to the second transport means 120 which is capable of moving in the direction of arrow 121 as shown in FIG. 6A.

Figure 6B:
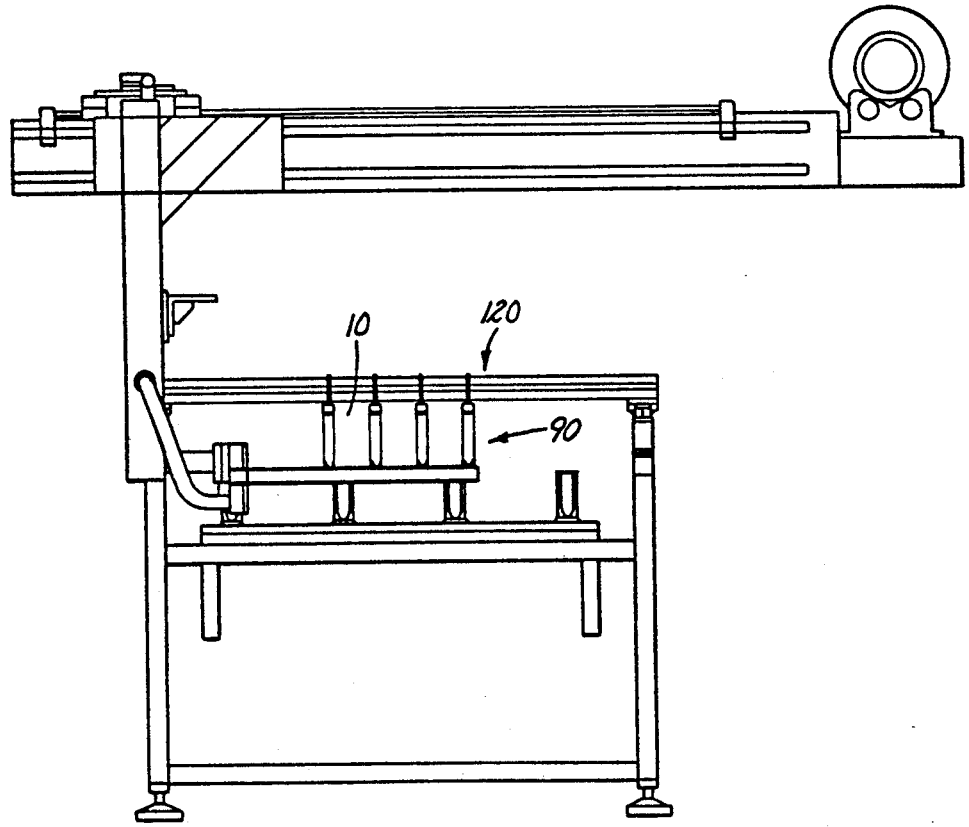
Figure 6C:
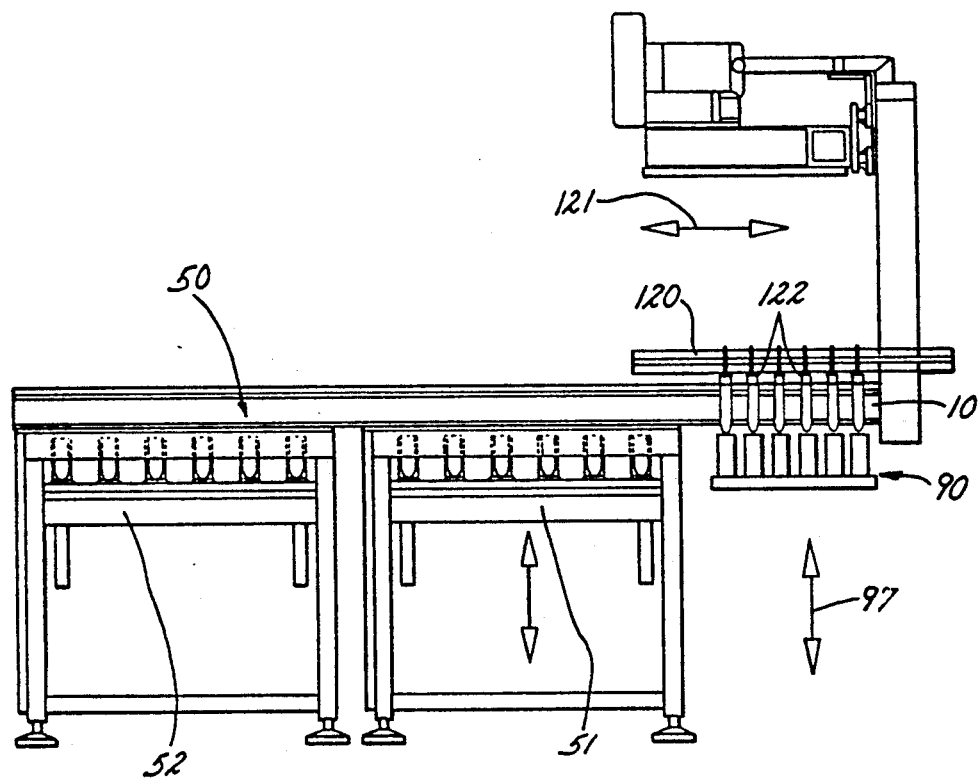
Figure 6D:
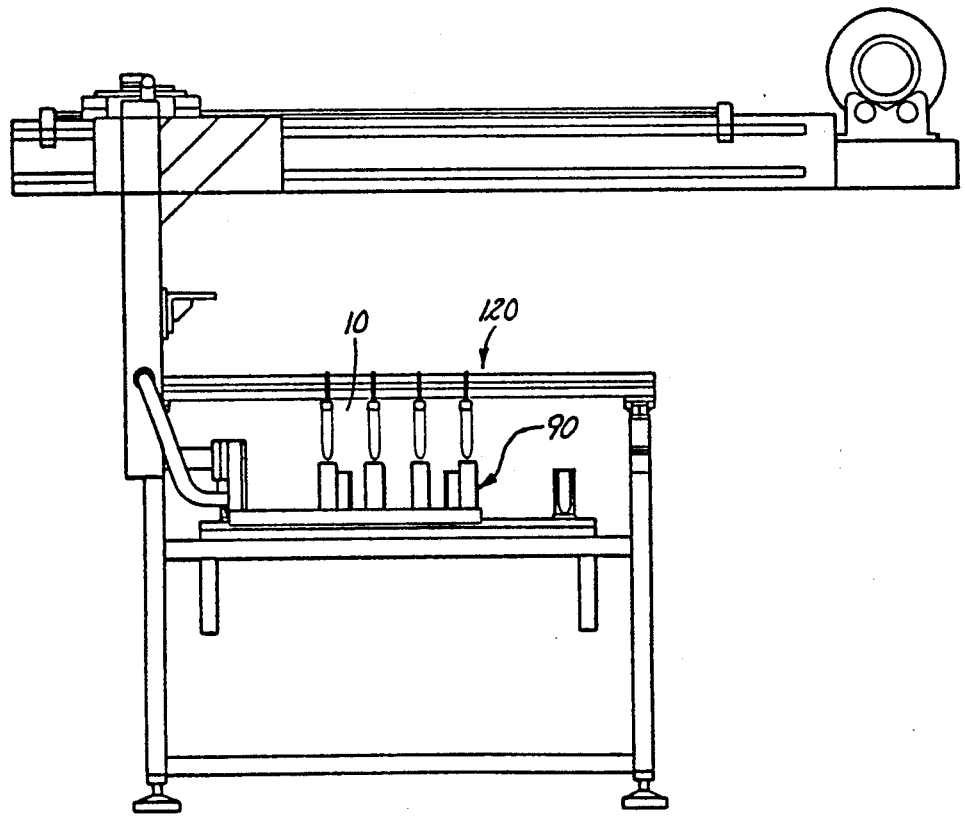

FIGS. 6A and 6B show side and end views, respectively, of the second transport means 120 moving in the direction of arrow 121 into position over the first transport means 90. First transport means 90 then moves upwards in the direction of arrow 96 and grippers 122 carried by the second transfer means 120 grab the neck portions of the parisons. FIGS. 6C and 6D show side and end views, respectively, of the parisons 10 gripped by the grippers 122 of the second transport means 120 and the first transport means 90 releasing the parisons by moving back down in the direction of arrow 97.

It is noted that the parisons 10 remain in a vertical position freely depending from neck portions 11, beginning with their transfer shown in FIG. 5C, throughout their travel through all subsequent sections, such as conditioning stations 51 and 52 and into the blow molding machine 70. The reason for so maintaining the parisons is to limit their deformation and the small amount of axial extension which may occur due to their weight and to avoid bending of their axis to which they would be subjected in a horizontal attitude, it being essential that the parisons be straight when entering the blow molding machine. The parisons are of course deformable throughout their transport whenever they remain at an elevated temperature as they emerge from the injection molding machine.

Figure 7A:
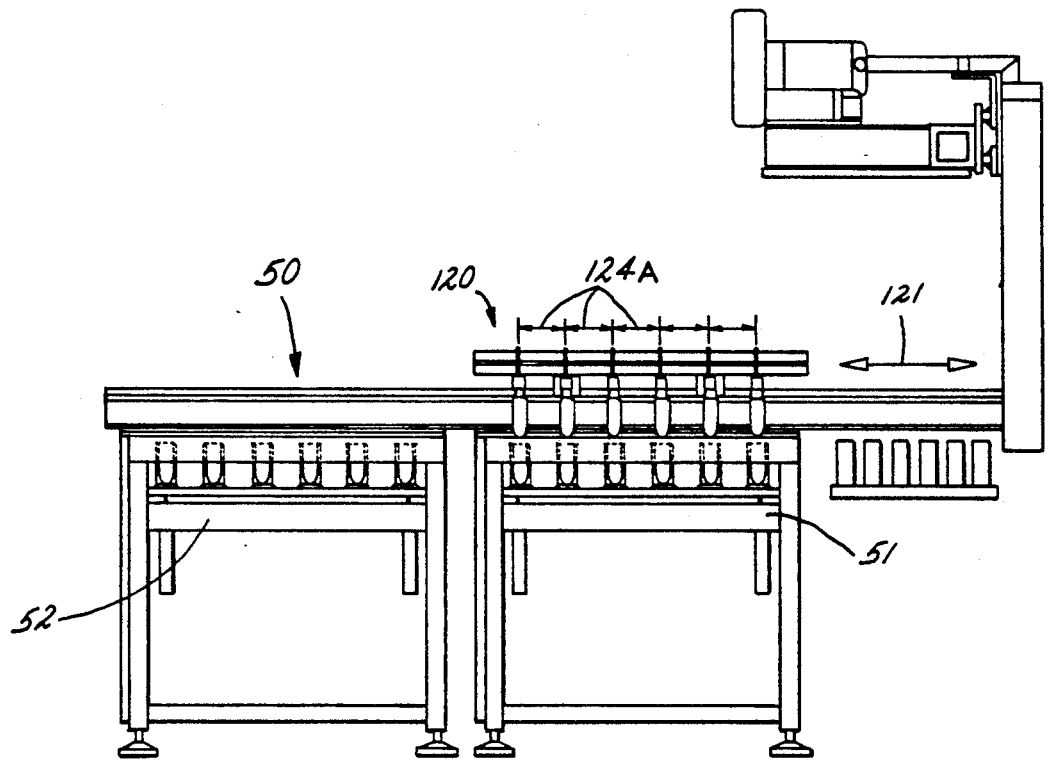
FIGS. 7A–7D show the second transport means changing the center spacing of the parisons and moved into position in the conditioning section.
Figure 7B:
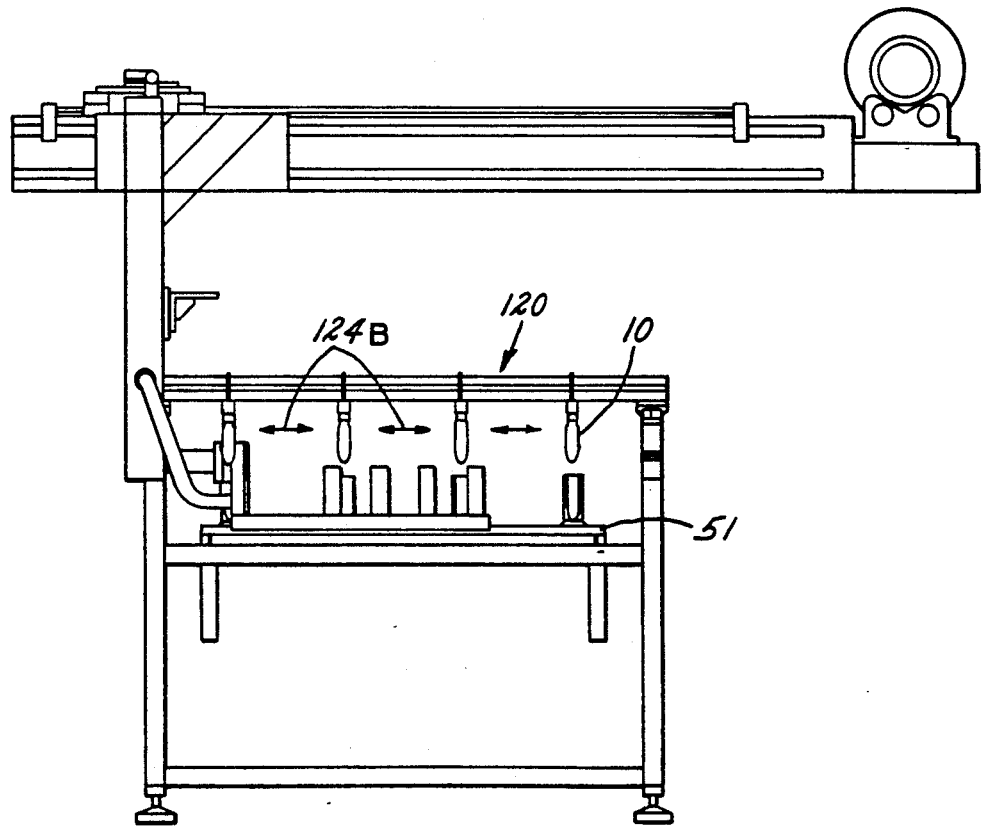

FIGS. 7A and 7B show side and end views, respectively, of the second transport means 120 moving in the direction of arrow 121 to conditioning section 50 directly over first conditioning station 51 of conditioning section 50. As the second transport means 120 moves to the conditioning section 50 the parisons are changed from the first center spacing of the injection mold to the second center spacing of the conditioning section leading to the blow molding machine. This is clearly shown in FIGS. 7A and 7B where parisons 10 are moved in the direction of arrows 124A and 124B, respectively, to reach said second center spacing, said movement being effected by a spreader (not shown) carried by second transport means 120.

Conditioning section 50 may consist of several stations of which the two stations 51 and 52 are shown as examples. The number of conditioning stations needed in a given instance depends on the types of operations to which the parisons have to be subjected prior to entry into the blow molding machine and the duration of these operations. Thus, the parisons may have to be cooled to a temperature determined by the capability of the material of the parisons to be oriented, e.g. an average temperature in the range of 80° to 100° F. in the case of PET. When so cooling the parison, as in sleeves 91 of transport means 90, or subsequent stations of section 50, parisons having a non-uniform wall thickness distribution, as along their axes, will tend to undercool wherever they are thinner than the sections that will have reached the correct temperature for orientation. In such instances, at least one station is used within section 50 to heat the said undercooled sections thereby bringing them to the temperature for optimum orientation. The parisons are thereby temperature-conditioned for the subsequent blow molding operation. The parisons may also have to be subjected to intermediate deformation as in the known process of heat setting shown in U.S. Pat. No. 4,318,882; certain portions thereof may have to be crystallized, as shown in U.S. Pat. No. 4,589,559; these examples not being meant to describe all possible such operations.

Any one of these operations may require more time than any one cycle of the injection molding machine. Yet, each conditioning station must synchronously release the parisons placed thereinto within that same cycle. Accordingly, more than one conditioning station is required for any conditioning operation that takes more time than given by the injection molding machine cycle.

The detailed description that follows will be discussed particularly with reference to a single conditioning station, since all additional ones operate in an analogous fashion.

Figure 7C:
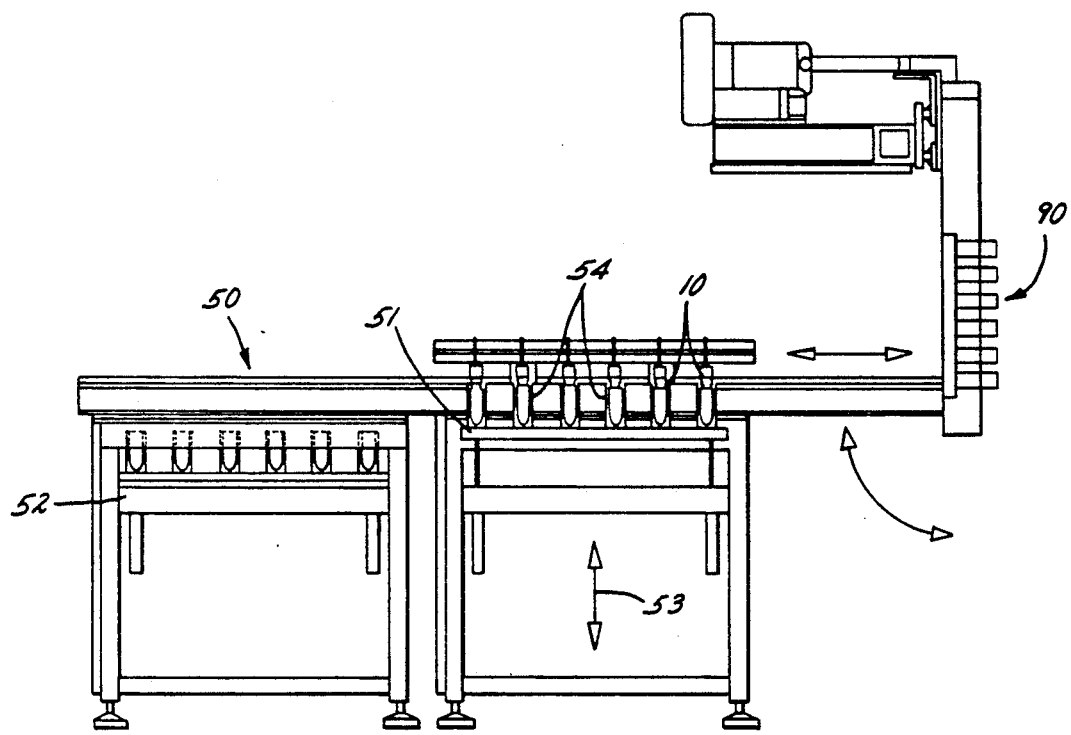
Figure 7D:
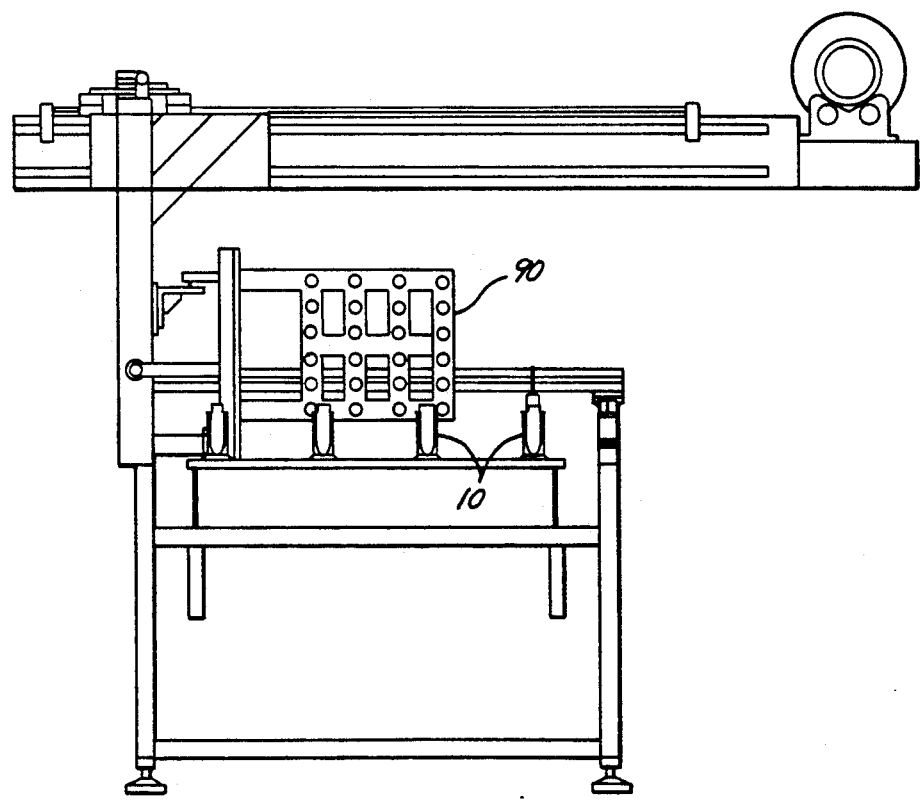

FIGS. 7C and 7D show side and end views, respectively of the first conditioning station 51 of section 50 moving upwardly in the direction of arrow 53 to position conditioning means 54 at parisons 10. Each parison may be positioned in separated conditioning means to avoid affecting adjacent parisons. For example, temperature conditioning may occur wherein the axial distribution of the temperature may be adjusted to obtain the desired temperature distribution for blow molding. While this occurs the first transport means 90 is free to move back to its upright position as shown in FIG. 5B, ready to enter the injection molding machine on the next cycle.

Figure 8A:
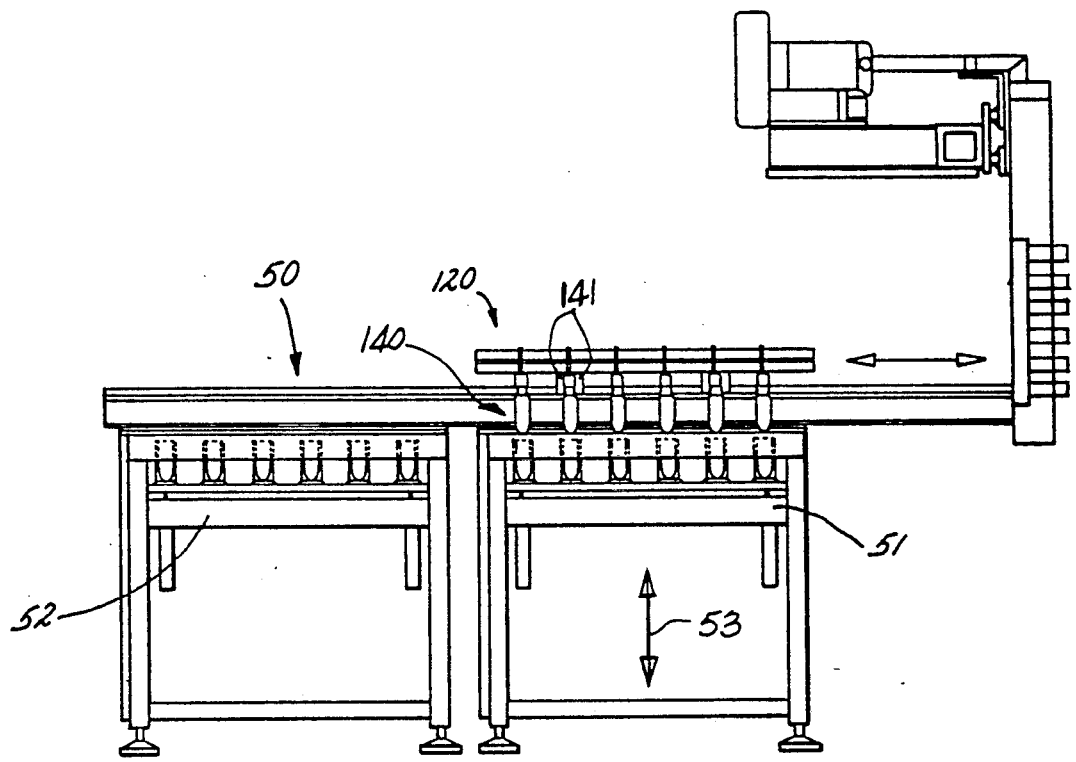
FIGS. 8A–8D show the transfer of the parisons from the first conditioning station to the second conditioning station.
Figure 8B:
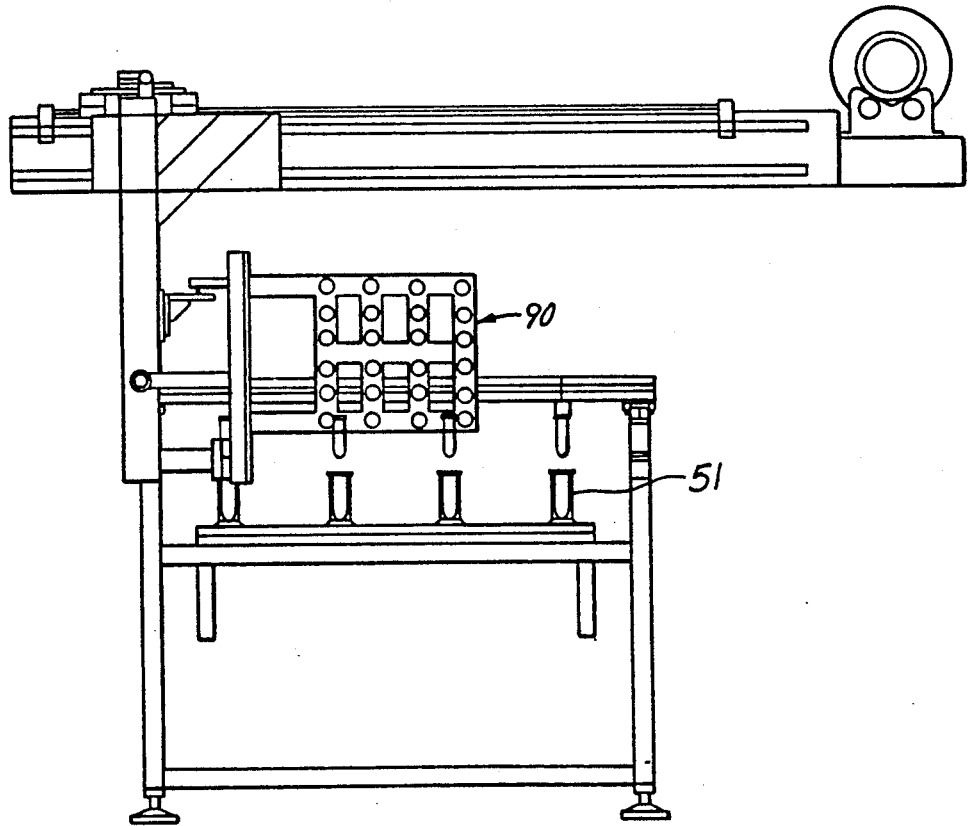

FIGS. 8A and 8B show side and end views, respectively, wherein the first conditioning station 51 is moved downwardly in the direction of±arrow 53 after its conditioning cycle is completed, leaving the parisons held by grippers 141 of the third transport means 140 in a manner to be more fully described below.

Figure 8C:
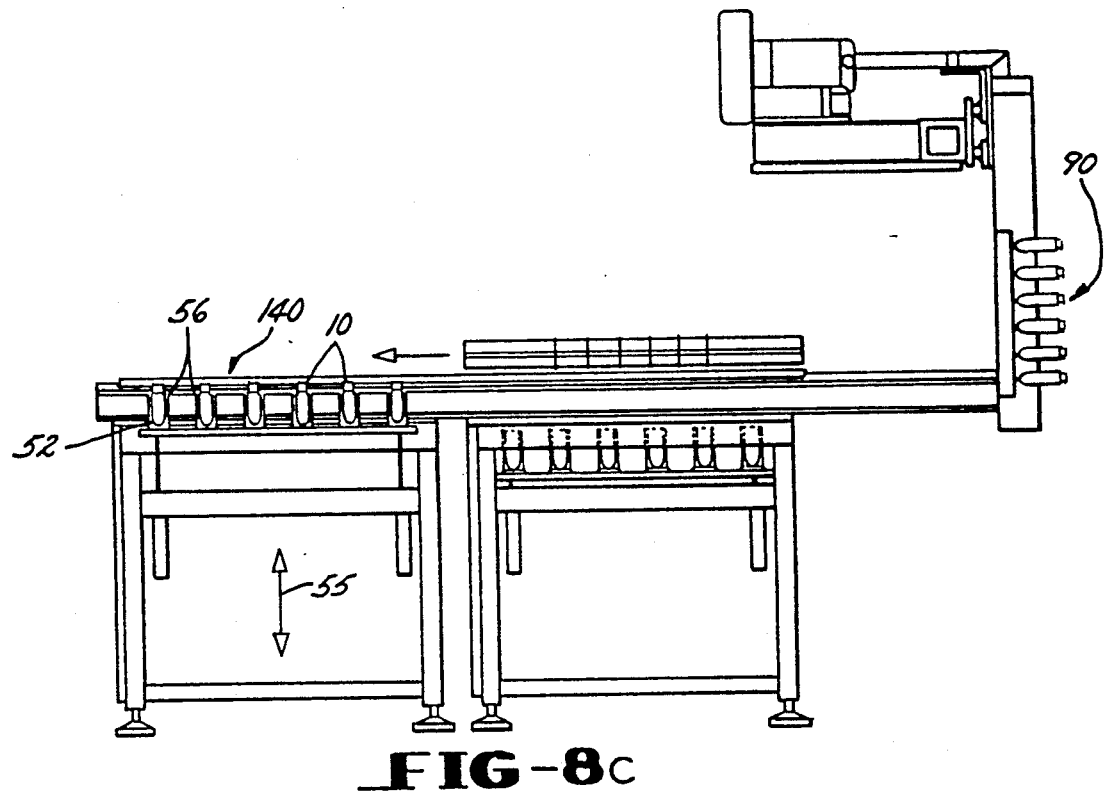
Figure 8D:
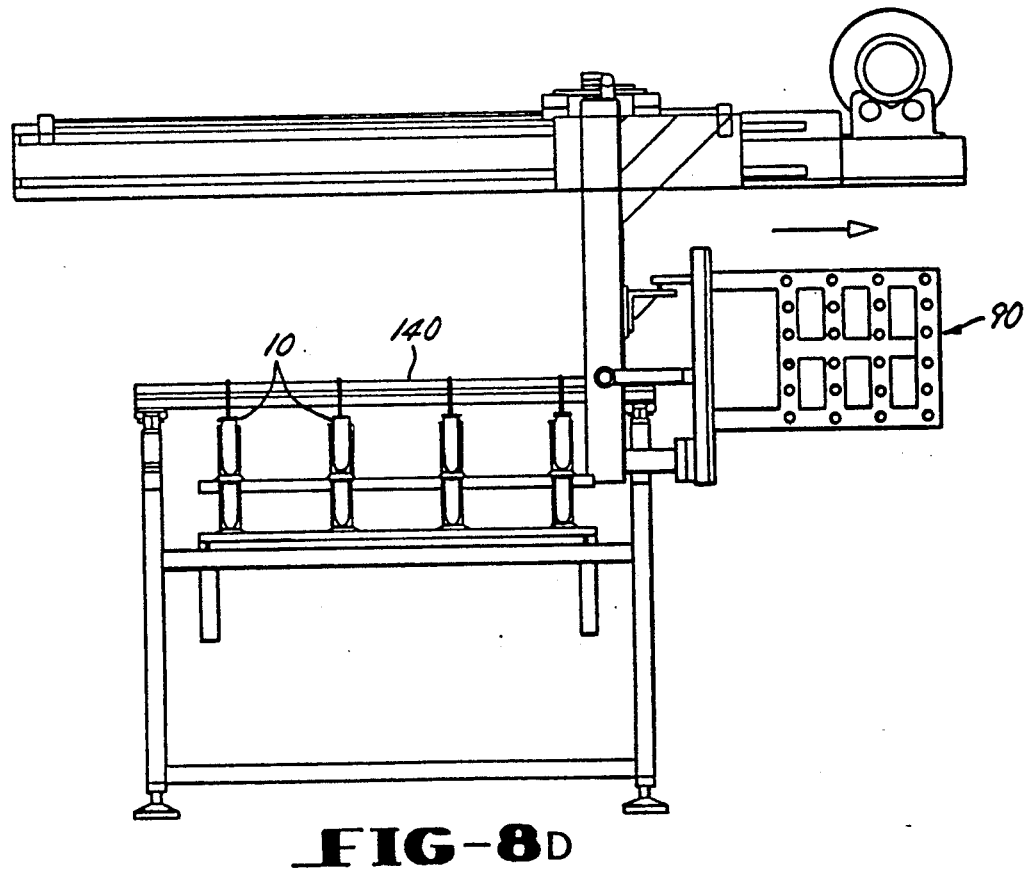

FIGS. 8C and 8D show side and end views, respectively, wherein grippers 141 of a first section of the third transport means 140 grip parisons 10, which are by then released by grippers 122 of second transport means 120, transporting them to the second conditioning station 52 which raises in the direction of arrow 55 so that the parisons are once more each situated within its conditioning means 56 for completion of the second conditioning cycle. Naturally, if desired, only a single conditioning section may be used whereupon the third transport means would transport the parisons directly to the blow molding machine. Also, if desired the second transport means may be arranged to transfer the parisons all the way to the blow molding machine and ejection stations At the same time the first transport means 90 moves into the open injection mold to receive a new batch of parisons for a further operating cycle.

FIGS. 9A through 9C show the temperature conditioned parisons moved to the blow molding machine. FIG. 9A is a side view. The second conditioning station 52 has been lowered and the fully conditioned parisons transferred to the blow molding machine 70 by the first section of the third transport means 140 which continue to grasp the conditioned parisons. Simultaneously with transfer of the conditioned parisons to the blow molding machine a second section of the third transport means 141 transfers previously blown articles 20 from the blow molding machine 70 to the product removal station or ejection station 100. In the meantime the first transport means 90 has come out of the injection mold with a new batch of parisons for processing.

FIGS. 9B and 9C show the blow molds in blow molding machine 70 in the open and closed position, respectively, in a conventional manner. FIG. 9B shows blow mold halves 71 and 72 in the open, i.e., spaced apart position with parisons 10 held therein by the first section of the third transport means 140. FIG. 9C shows the halves closed to form closed blow molds 73 surrounding parisons 10.

Figure 10A:
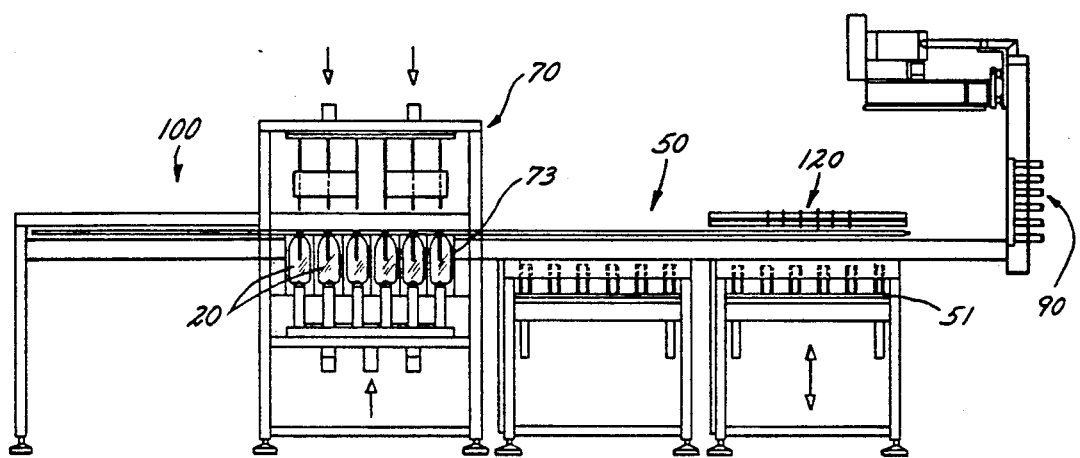
FIGS. 10A–10C show stages of the blowing operation.
Figure 10B:
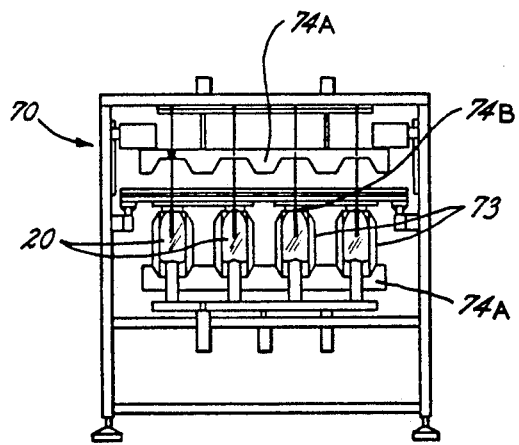
Figure 10C:
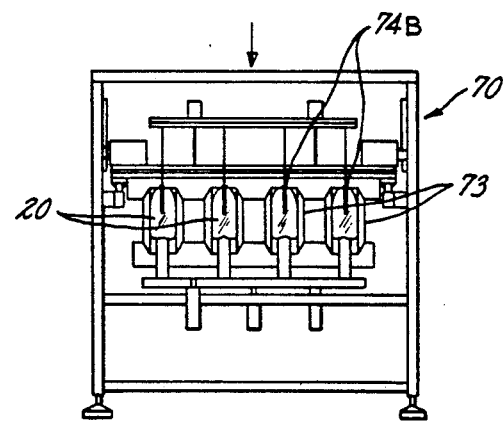

FIGS. 10A through 10C show further stages in the blowing operation, with the final hollow articles 20 fully stretched and blown in each respective blow mold 73. It is noted that, in the example shown, the cycle includes processing the complete output from the injection molding machine. FIGS. 10A and 10B show the blow molds 73 in the closed position and FIG. 10C shows blow molds 73 closed and locked by means of the mold locking beams 74A; and stretch rods 74B moved into position for blowing parisons 10 into articles 20.

Figure 11A:
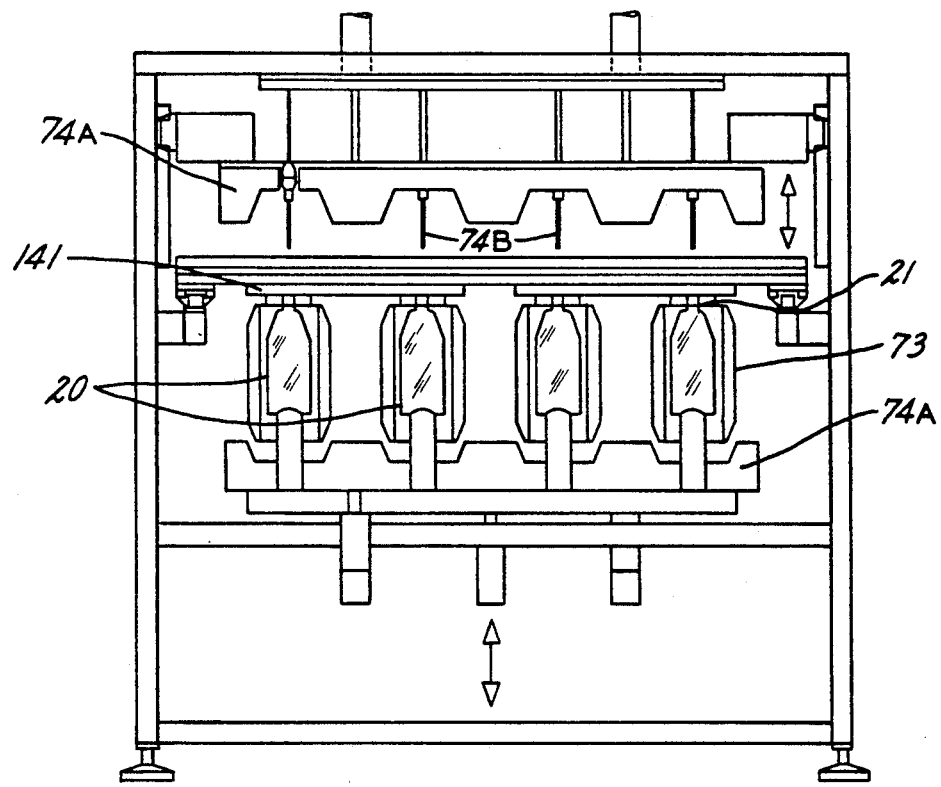
FIGS. 11A–11B show further details of the blow molding machine.
Figure 11B:
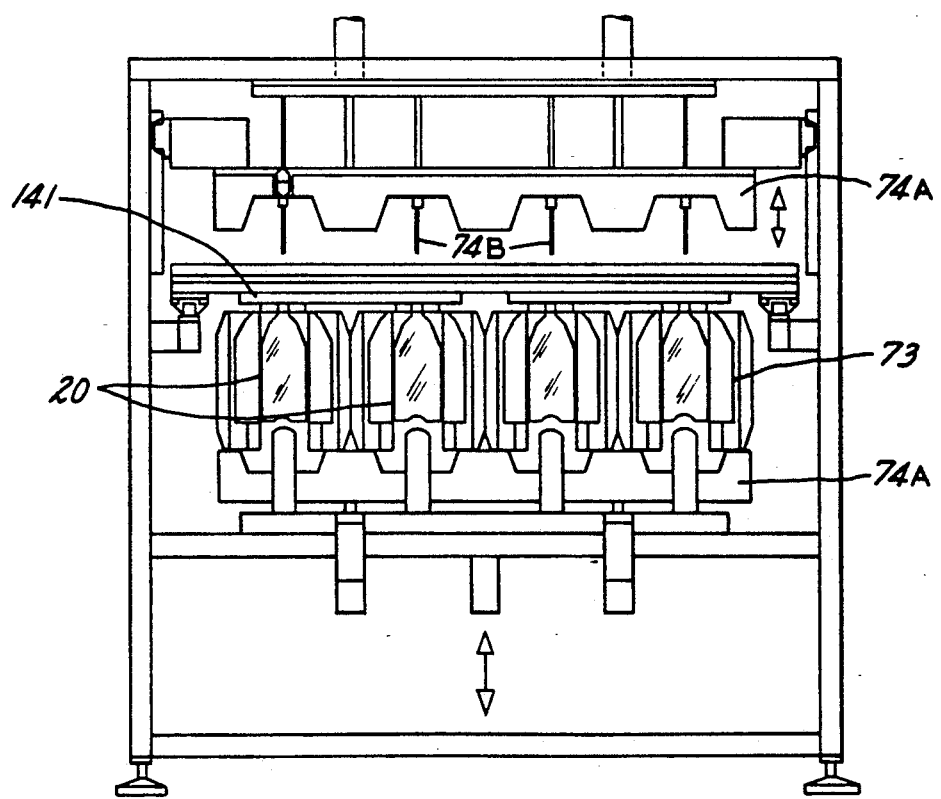

FIGS. 11A and 11B show the blow molds 73 in the open positions, respectively, the stretch rods 74B removed and the final blown, hollow articles 20 ready to be moved to the product removal station by the second section of the third transport means 141, gripped by the neck 21. Transportation means 141 will have moved into position over the blown articles while the first section of the third transport means moves to the conditioning section for another cycle. The locking bars 74A are moved away from the molds 73 and the stretch rods 74B removed from the blown articles, as shown.

Figure 12A:
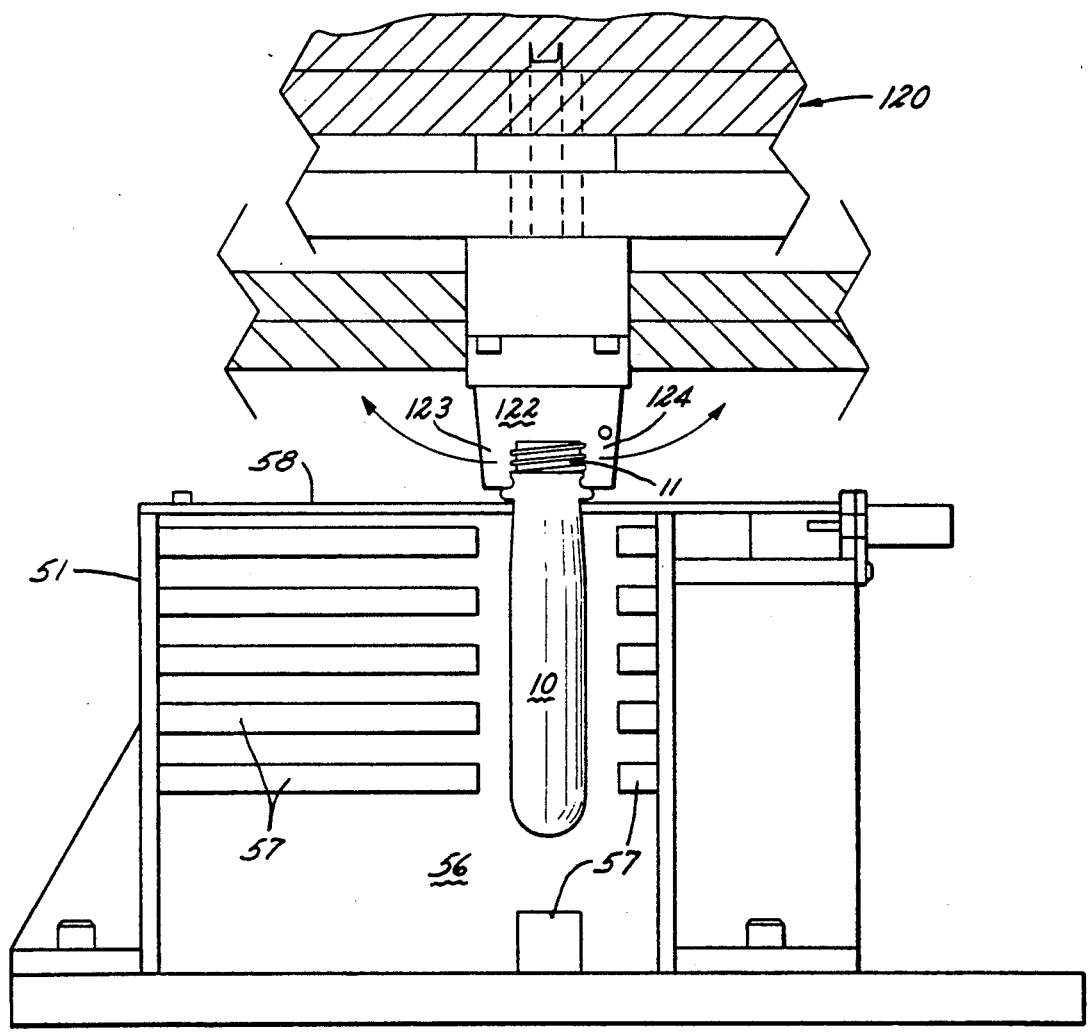
FIGS. 12A–12E show details of the operation of the conditioning stations.
Figure 12B:
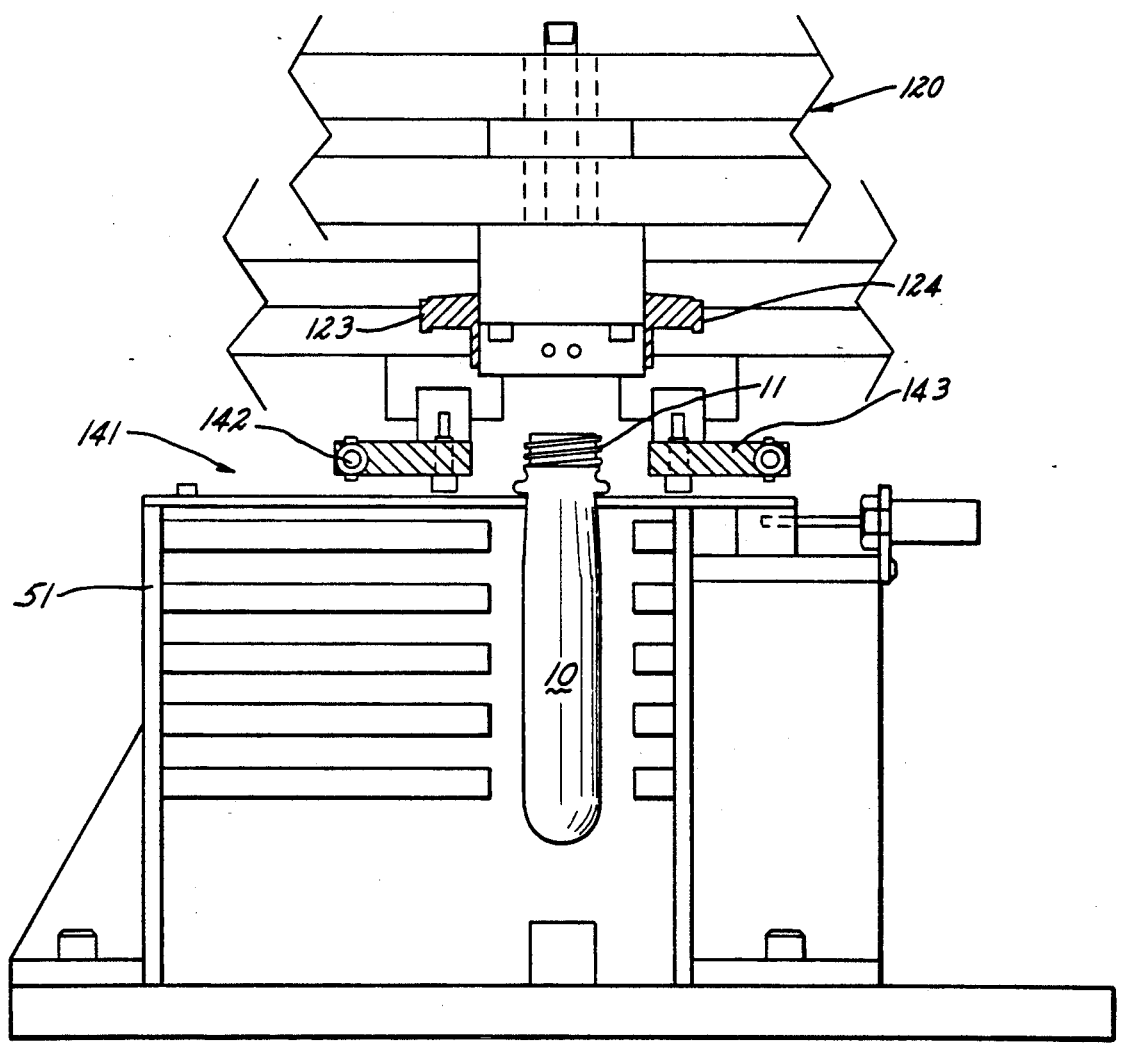
Figure 12C:
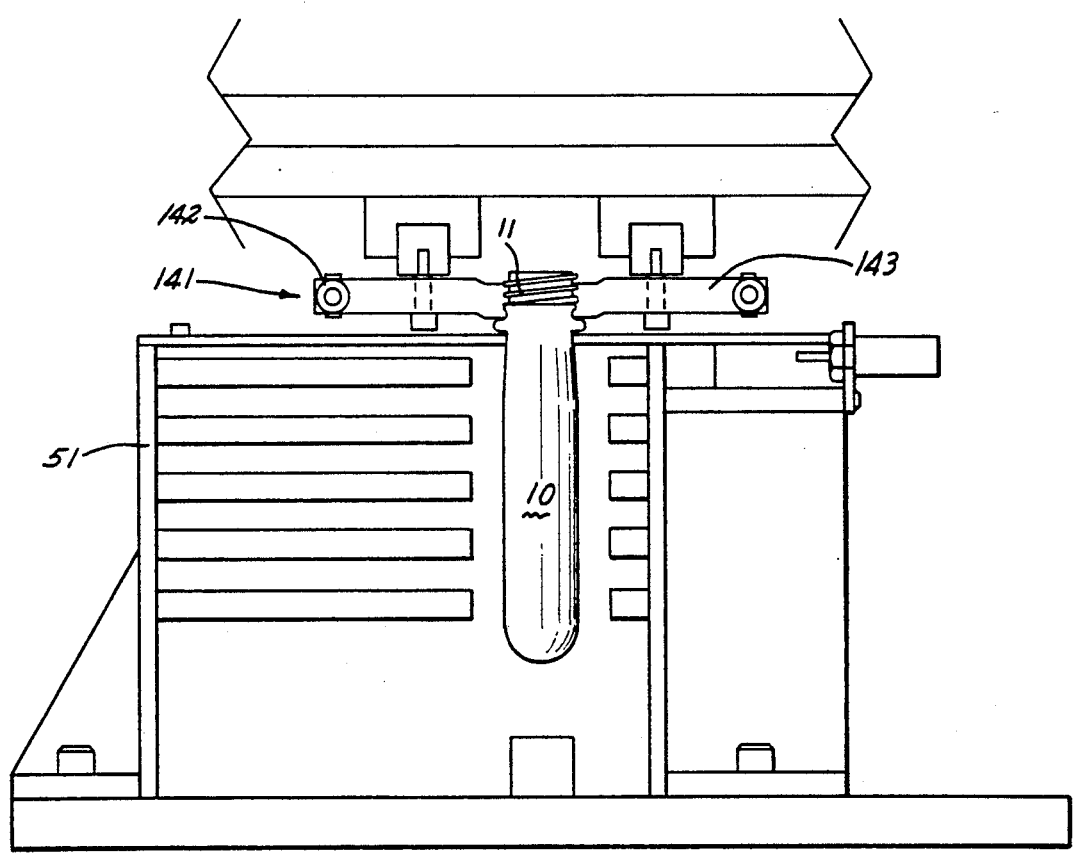
Figure 12D:
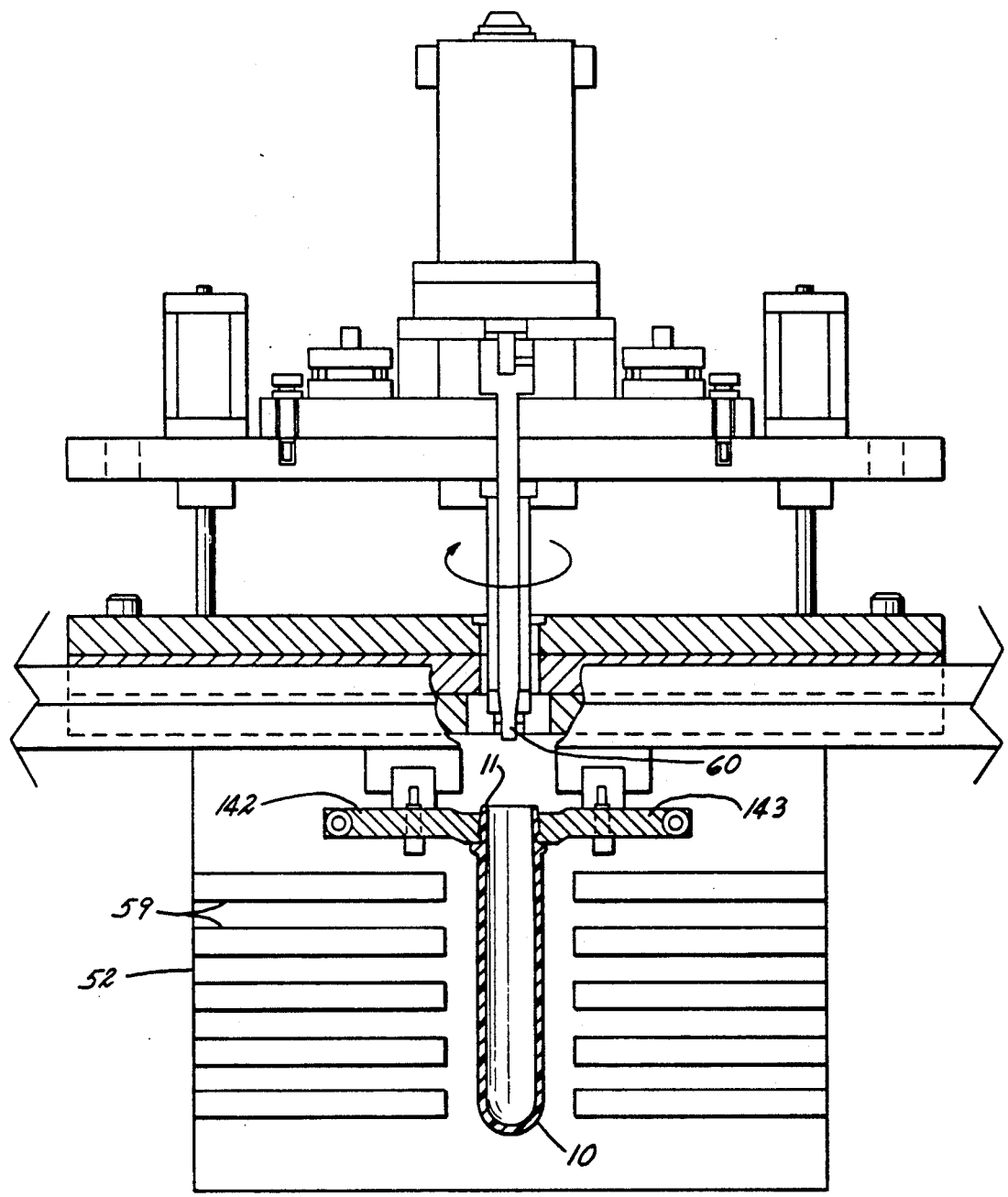
Figure 12E:
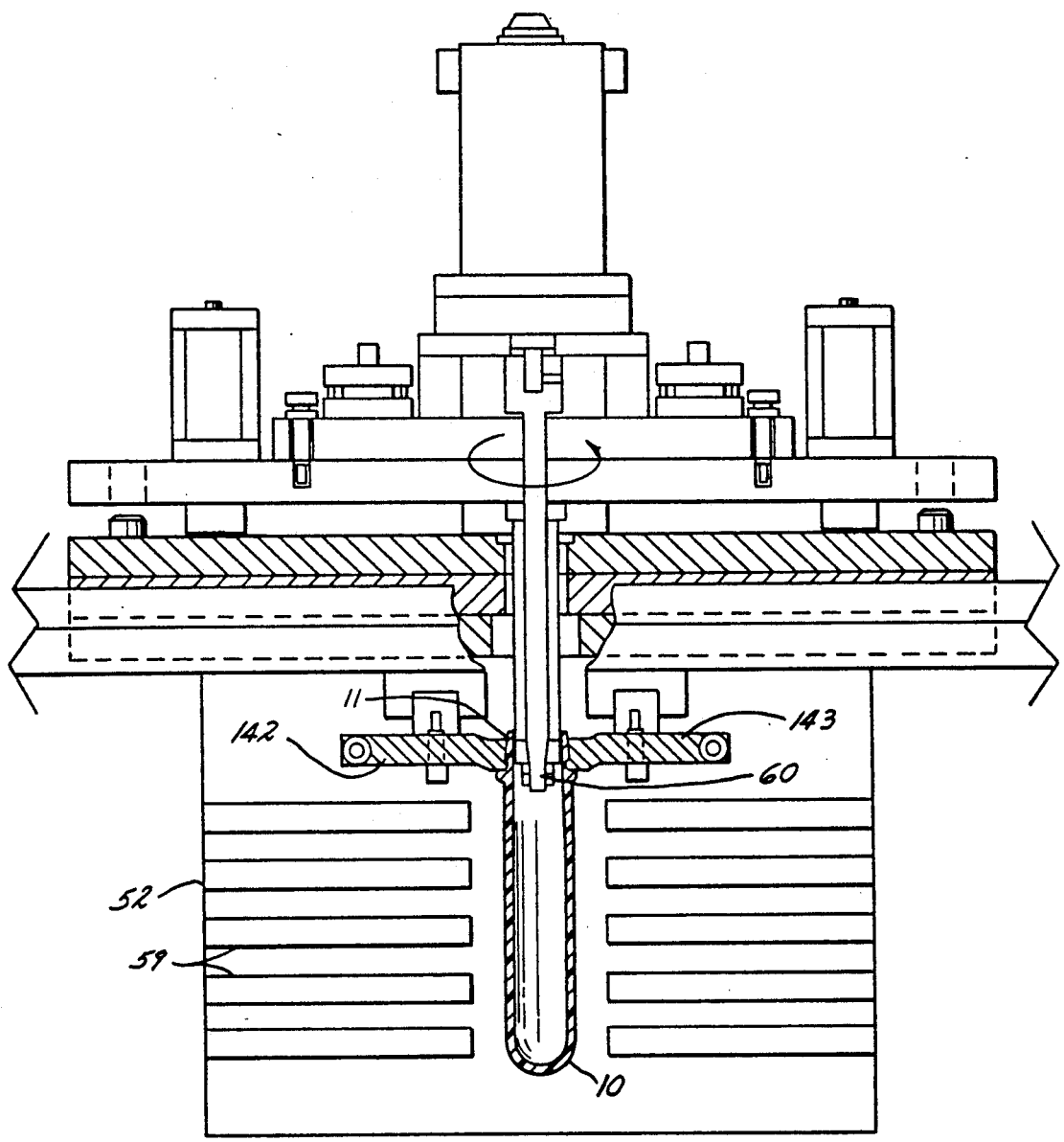

FIG. 12A shows parisons 10 held in first conditioning station 51 by grippers 122 of second transport means 120 with fingers 123 and 124 of grippers 122 closed around parison neck 11. Grippers 122 of the second transport means 120 are positioned to take over the parisons after their move to the second center spacing while on second transport means 120, as described above. First conditioning station 51 shown here, for example, as a temperature adjusting means, includes a plurality of separate heating and/or cooling means 57 which are separately controlled as to intensity and time of application to obtain a predetermined axial temperature pattern in the parison so as to induce a corresponding rate of deformation of said parisons while being processed in the blow molding machine. In the example shown in FIG. 8C, each parison 10 may be assigned separate and independent conditioning means 56 with parison neck region 11 being shielded by cover 58. In FIG. 12B gripper fingers 123 and 124 have opened and moved upwards away from parison 10 and the second section of the third transport means 141 moved into position adjacent neck portion 11 of parison 10. Clamp fingers 142 and 143 of the third transport means are in the open position. FIG. 12C shows clamp fingers 142 and 143 closed around neck region 11 ready to transfer parisons 10 to the second conditioning station 52 as shown in FIGS. 12D and 12E. As a further example, FIG. 12D and 12E show the second conditioning station 52 equipped with separately controlled radiant heating means 59 to attain the desired axial temperature pattern in parison 10, in which uniform peripheral temperature distribution is obtained by rotating the parison while exposed to the heaters. This is accomplished by means of rotatable plugs 60 movable to engage neck region 11 and expanding outwardly into firm holding engagement with the neck region while fingers 142 and 143 are open to permit rotation of parison 10. After such conditioning, plugs 60 are released, clamp fingers 142 and 143 engage neck region 11, plugs 60 are raised and the parisons transferred to the next operation, as into the blow molding machine.

As before noted, additional processing stations may be used to allow more time to temperature condition the parisons, or to expand them by known means at heat setting temperature, or to crystallize selected portions thereof. Typically, such operations, while well known as to process and apparatus, are conventionally performed in individual, separately operating machinery. It is an advantage of the present invention that any of these devices may be interconnected by means of the apparatus described herein and thereby work synchronously under unified control, linking primary operations, such as pressure molding and container blowing, while also performing secondary operations between the two, thus rendering the overall process more efficient and better controllable.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for conditioning pressure molded plastic articles preparatory to a finishing operation, which comprises:
   means for delivering a number of pressure molded plastic articles;
   a finishing machine for performing a finishing operation upon said articles downstream of the delivery means;
   a conditioning section having means to adjust the temperature of said articles between said delivery means and said finishing machine comprising independently operable means for serially cooling said articles and temperature control means to impose thereon the axial temperature distribution required to perform said finishing operation, said conditioning section comprising;
   at least one conditioning station within said conditioning section including means to cool said articles according to a predetermined pattern;
   at least one conditioning station within said conditioning section including means to heat said articles according to a predetermined pattern;
   wherein said conditioning station including means to cool is separate from and spaced from said conditioning station including means to heat;
   first transport means positioned to remove said articles from said delivery menas;
   second transport means positioned to transfer said articles form said first transport means to said conditioning section; and
   wherein each of said conditioning station processes the complete number of pressure molded articles delivered by the means for delivering.

2. Apparatus according to claim 1 wherein said delivery means is a pressure molding machine.

3. Apparatus according to claim 2 wherein said pressure molding machine forms a plurality of plastic parisons and wherein said finishing machine is a blow molding machine including blow molds for forming hollow plastic articles from said parisons.

4. Apparatus according to claim 3 wherein the blow molding machine and conditioning section process the complete number of parisons formed at the pressure molding machine in a single, synchronous cycle.

5. Apparatus according to claim 3 including third transport means for transferring said parisons from the section proceeding the blow molding machine to the blow molding machine 6. Apparatus according to claim 5 wherein said conditioning section includes a first and second conditioning station, wherein said third transport means transfers said parisons from the first to second conditioning stations 7. Apparatus according to claim 5 wherein said third transport means transfers the hollow plastic articles to the removal station.

8. Apparatus according to claim 3 including a blown product removal station downstream of the blow molding machine to remove the hollow plastic articles.

9. Apparatus according to claim 3 wherein said pressure molding machine forms parisons having axially variable wall thickness.

10. Apparatus according to claim 9 wherein said pressure molding machine forms parisons in a mold wherein said plurality of parisons have a first center spacing, said blow molds have a second center spacing larger than said first center spacing, and said second transport means has means to change the center spacing of said parisons from said first center spacing to said second center spacing.

11. Apparatus according to claim 10 wherein said conditioning stations has means to induce a corresponding pattern Of deformation Of said parisons while being processed in said blow molding machine.

12. Apparatus according to claim 10 wherein said second transport means has means to change the center spacing while moving between the first transport means and conditioning section.

13. Apparatus according to claim 1 wherein said conditioning section comprises a single conditioning station having means to cool and heat.

14. Apparatus according to claim 1 wherein said conditioning section comprises at least two separate conditioning stations, one of which has means to cool and the other has means to heat.

15. Apparatus according to claim 1 including means to transport the articles through the conditioning section at the same level throughout their transport, wherein said conditioning section includes means to move the conditioning section into adjacent, heat exchange relationship with the articles.

16. Apparatus according to claim 1 wherein said first transport means includes means to prevent the articles from bending and to cool said articles, and wherein the second transport means maintains the articles in a vertical orientation.

17. Apparatus according to claim 1 wherein said conditioning section has means to heat set said articles.

18. Apparatus according to claim 1 wherein said plastic is polyethylene terephthalate and wherein said conditioning section has means to crystallize said plastic.

19. Apparatus according to claim 1 including means to rotate the parisons in the conditioning section.

20. Apparatus according to claim 1 wherein said conditioning section includes heating means selected from the group consisting of radiant heating means and convective heating means, and cooling means selected from the group consisting of convective cooling means and conductive cooling means.

21. Apparatus according to claim 1 wherein said parisons are vertically disposed depending from the neck portions thereof at least through the conditioning section and finishing machine.

22. Apparatus for preparing hollow plastic articles which comprises:
a pressure molding machine for forming a plurality of plastic parisons having axially variable wall thickness in a mold wherein said plurality of parisons have a first center spacing in said mold;
a blow molding machine for forming hollow plastic articles form said parisons downstream of the pressure molding machine in a blow mold in which said parisons and hollow articles formed therefrom have a second center spacing larger than said first center spacing;
a conditioning section having means to condition said parisons between said pressure molding machine and blow molding machine comprising independently operable means for serially cooling said parisons and temperature control means to impose thereon the axial temperature distribution to perform said blow molding operation, said conditioning section including;
delivery means for delivering a number of parisons from the pressure molding machine to the conditioning section; at least one conditioning station within said conditioning section including means to alternately cool and heat said parisons according to a predetermined axial pattern so as to induce a corresponding pattern of deformation of said parisons while being processed in said blow molding machine;
first transport means positioned to remove said parisons from said pressure molding machine and to cool said parison;
second transport means positioned to transfer said parisons from said first transport means to said conditioning section and having means to change the center spacing of said parisons from said first center spacing to said second spacing; and
wherein said conditioning section processes the complete number of parisons delivered by the delivery means.

23. Apparatus according to claim 22 wherein said pressure molding machine is an injection molding machine.

24. Apparatus according to claim 22 including third transport means for transferring said parisons from the section proceeding the blow molding machine to the blow molding machine.

25. Apparatus according to claim 24 wherein said conditioning section includes a first and second conditioning station, wherein said third transport means transfers said parisons from the first to second conditioning stations.

26. Apparatus according to claim 24 including a blown product removal station downstream of the blow molding machine to remove the blow molded product.

27. Apparatus according to claim 30 wherein said third transport means transfers the blown product to the removal station.

28. Apparatus according to claim 22 wherein the blow molding machine and conditioning section process the complete number of parisons formed at the pressure molding machine in a single, synchronous cycle.

29. Apparatus according to claim 22 including means to rotate the parisons in the conditioning section.

30. Apparatus according to claim 29 wherein said parisons are vertically disposed depending from the neck portions thereof at least through the conditioning section and blow molding machine.

31. Apparatus according to claim 22 wherein said conditioning section includes heating means selected from the group consisting of radiant heating means and convective heating means, and cooling means selected from the group consisting of convective cooling means and conductive cooling means.

32. Apparatus according to claim 22 wherein said second transport means has means to change the center spacing while moving between the first transport means and conditioning section.

* * * * *

UNITED STATES PATENT AND TRADEMARK OFFICE
CERTIFICATE OF CORRECTION

PATENT NO. : 5,206,039
DATED : April 27, 1993
INVENTOR(S) : Emery I. Valyi

It is certified that error appears in the above-indentified patent and that said Letters Patent is hereby corrected as shown below:

Column 8, line 18,"o+" should read --of--.

Column 10, Claim 1, line 38, "menas" should read --means--.

Column 10, claim 1, line 40, "form" should read --from--.

Column 11, claim 11, line 16, "has" should read --have--.

Column 11, claim 11, line 17, "Of" should read --of--.
(both occurrences)
Column 12, claim 27, line 45, "claim 30" should read --claim 26--.

Signed and Sealed this

Fourth Day of January, 1994

Attest:

BRUCE LEHMAN

*Attesting Officer*   *Commissioner of Patents and Trademarks*